United States Patent [19]

Yuki et al.

[11] Patent Number: 4,509,127

[45] Date of Patent: Apr. 2, 1985

[54] CONTROL DEVICE FOR LOADING AND UNLOADING MECHANISM

[75] Inventors: Katsumi Yuki, Toyota; Susumu Yoshida, Aichi; Mineo Ozeki, Ichinomiya; Yasuyuki Miyazaki, Aichi; Masaru Kawamata, Numazu, all of Japan

[73] Assignee: Kabushiki Kaisha Toyoda Jidoh Shokki Seisakusho, Japan

[21] Appl. No.: 364,403

[22] Filed: Mar. 31, 1982

[30] Foreign Application Priority Data

| | | | |
|---|---|---|---|
| Mar. 31, 1981 | [JP] | Japan | 56-47736 |
| Mar. 31, 1981 | [JP] | Japan | 56-47738 |
| Mar. 31, 1981 | [JP] | Japan | 56-47742 |
| Mar. 31, 1981 | [JP] | Japan | 56-45959[U] |

[51] Int. Cl.[3] ........ G06F 15/20; G06G 7/48

[52] U.S. Cl. ........ 364/478; 364/474; 364/170; 364/184; 364/192; 414/274; 414/629; 414/636; 187/29 R; 318/571; 318/626

[58] Field of Search ........ 364/170, 184, 192, 513, 364/474, 478; 187/29 A, 29 B, 29 R; 414/273, 274, 401, 629, 636; 318/569, 571, 574, 603, 626, 632

[56] References Cited

U.S. PATENT DOCUMENTS

| | | | |
|---|---|---|---|
| 3,913,757 | 10/1975 | Lovey | 414/401 |
| 4,074,794 | 2/1978 | Scholl | 187/29 A |
| 4,108,282 | 8/1978 | Satoh et al. | 187/29 R |
| 4,169,290 | 9/1979 | Reed et al. | 364/900 |
| 4,220,221 | 9/1980 | Gingrich | 187/29 R |
| 4,268,783 | 5/1981 | Murray | 318/632 |
| 4,331,417 | 5/1982 | Shearer, Jr. | 414/273 |
| 4,351,416 | 9/1982 | Terazono | 187/29 R |
| 4,354,577 | 10/1982 | Yonemoto | 187/29 R |
| 4,362,979 | 12/1982 | Cannon | 318/603 |
| 4,404,505 | 9/1983 | Swanson et al. | 318/603 |
| 4,411,577 | 10/1983 | Shearer, Jr. | 414/274 |
| 4,411,582 | 10/1983 | Nakada | 414/636 |

FOREIGN PATENT DOCUMENTS

| | | | |
|---|---|---|---|
| 3106226 | 2/1981 | Fed. Rep. of Germany | 414/636 |
| 53-20263 | 2/1978 | Japan . | |
| 54-37378 | 11/1979 | Japan . | |

*Primary Examiner*—Jerry Smith

*Assistant Examiner*—John R. Lastova

*Attorney, Agent, or Firm*—Lowe, King, Price & Becker

[57] ABSTRACT

A control device for loading and unloading mechanism adapted to be incorporated in a fork lift truck comprises a sensor unit 100 including a lifting height sensor 102, a control unit 200 comprising a control command producing circuit 240 constituted by a microcomputer 230 producing a control command on the basis of comparing calculation between the output of the sensor unit 100 and the concerned data stored in the microcomputer 230, and a driving unit 300 producing a driving output signal so as to the lifting height of the fork 18 in accordance with the control command fed from the control unit 200. The control device includes a component operable for inhibiting storage of sampled lifting height data when the actual lifting height data are not within an allowed range, thereby to prevent erroneous operation based on erroneous data and to effect smooth follow-up speed control to the target height when automatic lifting height control is effected. The control device further comprises structure for slowly stopping the fork at the time of the automatic lifting height control. Prior to the automatic lifting height control, when lifting height data is stored in the microcomputer 230, the control device is designed so that lifting height data within a predetermined range can be sampled. Furthermore, the valve opening angle of the control valve for actuating a lift cylinder 346 is limited to a predetermined range, thereby stabilizing a lifting height speed.

19 Claims, 24 Drawing Figures

FIG. 15A
FIG. 15B
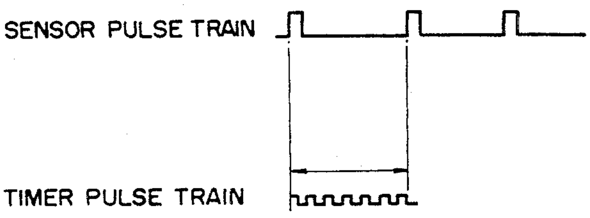
FIG. 15C
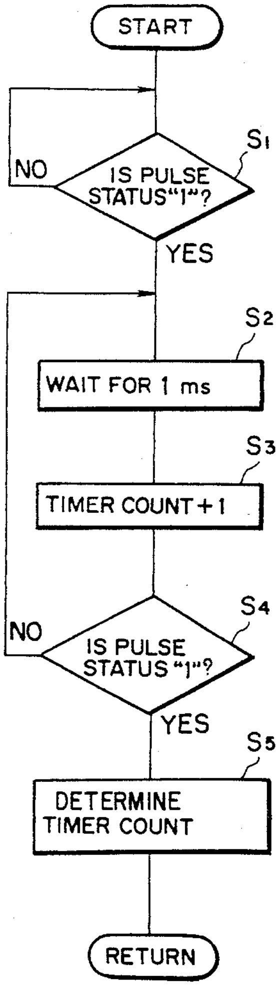

CONTROL DEVICE FOR LOADING AND UNLOADING MECHANISM

BACKGROUND OF THE INVENTION

The present invention relates to a control device for loading and unloading mechanism, and more particularly to a lifting height control device incorporated in a fork lift truck. Specifically, the present invention is concerned with a lifting height control device which effects a lifting height control in accordance with lifting height data stored in a microcomputer.

As is well known, a fork lift truck comprises a loading and unloading mechanism and a vehicle body. The loading and unloading mechanism comprises a vertically elongated guide rail hereinafter called an "upright", and a fork slidable in the upright. The mechanism further comprises a hydraulic member, as for example, hydraulic cylinder for lifting and lowering the fork and tilting the upright.

In connection with prior art loading and unloading control devices providing, for instance, lifting height control, the following drawbacks are pointed out. Recently, there has developed a tendency to provide a lifting height which is high when loading and unloading work is effected with a fork lift truck. For instance, the piling and unloading may be required to take place at heights in excess of 10 m. In such a case, it is difficult for an operator to adjust the loading and unloading mechanism so that the fork is placed at the required predetermined height, since the operator is required to look at the top of the fork positioned approximately 10 m above the seat of the operator. Accordingly, it is desirable for the operator to easily effect piling and unloading the load at the predetermined position.

In order to embody this requirement in the prior art, the upright is provided with a limit switch for stopping the fork at a predetermined position. When the fork reaches a predetermined position, for instance, 8.5 m, the control device is designed so as to light a lamp provided at the operator's unit or to break a driving power supply for loading and unloading work. Usually, a load is unloaded on a shelf with a plurality of steps. For this reason, in order to determine the desired position it is required to select the particular step. The provision of a predetermined number of limit switches, for instance ten, is required in order to meet the height of the shelf. Further, the piling and unloading may also be required at another shelf in the working place. In such a case, if the height of the shelf is different from that of the prior one, a more complicated control device is required. Actually, it has been impossible to effect the piling and unloading work. Further, from the point of view of system control in the prior art, a plurality of analog control circuits, such as combinations of relay circuits which are respectively provided for the controlled system, as for example lifting height control, are incorporated in the control unit of the control device for the loading and unloading mechanism. Prior to performing the lifting work, an operator effects various settings according to the lifting height condition required for loading and unloading work and then starts a lifting operation. In this instance, an automatic control system is constituted, which includes therein a valve opening control system provided with respect to a hydraulic pressure circuit for actuating a lift cylinder. The lifting height control is effected so as to control the valve opening control system due to the deviation between an actual lifting height and the above said setting value. However, when the setting is changed to a great extent in accordance with a change in the workpiece for loading and unloading, it is required to adjust the automatic control system in order to stabilize the control system. Alternately, it may happen that the desired control accuracy cannot be obtained. Further, such a lifting height control is effected in a series of control sequences for loading and unloading work with the lifting height control being related to various kinds of controls. Accordingly, it is desirable to supervise the whole system control in view of the simplicity of the circuit and harmonious execution of the control.

In view of this, another attempt has been made. The programmed series of control sequences matching with a target loading and unloading operation is stored in a computer, such as a microcomputer. When, for instance, lifting height control is effected, the appropriate programmed routine for lifting height control is called from the program to effect a lifting height control due to the execution of the programmed routine. In this instance, prior to performing the lifting height operation, the setting is effected by memorizing the target lifting height into the microcomputer. When a push-button for starting an automatic lifting height is pushed, execution of the program for lifting height control routine starts. Thus, the automatic control system including therein the abovementioned valve opening control system becomes operative on the basis of the command being fed from the microcomputer so that the fork moves to the target lifting height to automatically stop thereat. Accordingly, when a change of setting is required, the changed lifting height is memorized, or stored, into the microcomputer. When calling the routines for lifting height control, it is sufficient to call the concerned appropriate routine in such a manner to distinguish it from the other.

In such a computer controlled lifting height control device, prior to storing the target lifting height of the fork, the operation of moving the fork to the objective position is carried out manually. This work has been effected by directly actuating a lift valve with a manual lever, or by controlling a servomotor for controlling the lift valve with a pair of lifting and lowering lever switches. Particularly, when the servomotor is controlled with the lifting and lowering lever switches, an erroneous actuation of lever switches in a loaded condition is dangerous. Further, it is difficult to precisely move the fork to the target position with lever switches. For this reason, in addition to the actuation of lever switches, the actuation of the abovementioned manual lever is required, with the result that the device becomes complicated. Further, when a lifting height is stored in the microcomputer, if the lifting height data are sampled ranging the upper limit of movement of the fork from the lower limit thereof, there occur inconveniences when an automatic lifting height control is effected, due to the unloaded or loaded conditions, or the thickness of the fork. The method of solving such a problem has not been proposed in the prior art. Further, when the lifting speed of the fork is controlled by an automatic lifting height control effected due to the stored lifting height data, if the command for changing the speed is given, it has heretofore been difficult to effect a follow-up control because of the fact that the characteristic of the opening angle of the lift valve with respect to the lifting or lowering speed of the fork is non-linear, and that there exists a response delay inherent in the automatic control system. Furthermore, when the fork reaches the target lifting height and then is stopped thereat, there is not provided a mechanism for slowly stopping the fork. Accordingly, the fork may be stopped suddenly, which may result in a safety problem.

SUMMARY OF THE INVENTION

With the above in mind, an object of the present invention is to provide a control device for a loading and unloading mechanism making it possible to solve various problems occuring when an automatic lifting height control is effected in accordance with stored lifting height data.

It is a more specific object of the present invention to provide a control device for a loading and unloading mechanism including a means for inhibiting storage of lifting height data in a memory, when the actual lifting height data are not within an allowed region, thereby making it possible to smoothly effect automatic lifting height control.

Another object of the present invention is to provide a control device for a loading and unloading mechanism making it possible to gradually approach the target value due to a response delay of an automatic control system for lifting height speed before or immediately before the setting is not altered when an automatic lifting height control is effected, thereby enabling to slowly and securely stop a fork at the target value.

Another object of the present invention is to provide a control device for loading and unloading mechanism wherein there is provided a slow stopping means, thereby enabling a fork to be slowly stopped at the target value to improve safety in lifting height control.

Another object of the present invention is to provide a control device for a loading and unloading mechanism making it possible to sample lifting height data within a predetermined range when lifting height data is stored in a command producing circuit, e.g. a microcomputer, thereby enabling the effecting of a smooth automatic lifting.

It is another object of the invention to provide a control device for a loading and unloading mechanism wherein a valve opening angle of a lift valve fed to a lift cylinder for lifting and lowering a fork is limited to a predetermined range, thereby stabilizing a lifting speed when an automatic lifting height control is effected.

According to the present invention, there is provided a control device for a loading and unloading mechanism adapted to be incorporated in a fork lift truck comprising: a sensor unit, a control unit responsive to the output signal of the sensor unit, the control unit effecting a calculation on the basis of a comparison the output signals of the sensor with data stored in a memory and producing a valve opening command signal according to the calculated value, and a driving unit responsive to the command signal, the driving unit producing a driving output control signal so as to vary the lifting height of a fork, the control unit comprising an interface circuit for inputting the output signal from the sensor unit and a control command producing circuit comprising the memory for storing a lifting height data and a data input means for inputting data to the memory, and characterized in that the control command producing circuit includes an inhibiting means for inhibiting storage of data in the memory when the sensed lift height data are outside a preselected range, in order to prevent erroneous operations and to smoothly effect an automatic lifting height control in accordance with the control command.

BRIEF DESCRIPTION OF THE DRAWINGS

The feature and advantages of a control device for loading and unloading mechanism according to the present invention will become more apparent from the description taken in conjunction with the accompanying drawings, in which:

FIGS. 15A and 15B are waveforms illustrating sensor pulse train and timer pulse train, respectively, which are used at a step four of the FIG. 14 flow chart;

FIG. 15C is a flow chart for producing the timer pulse train shown in FIG. 15B;

DETAILED DESCRIPTION OF THE PREFERRED EMBODIMENTS

Figure 1:
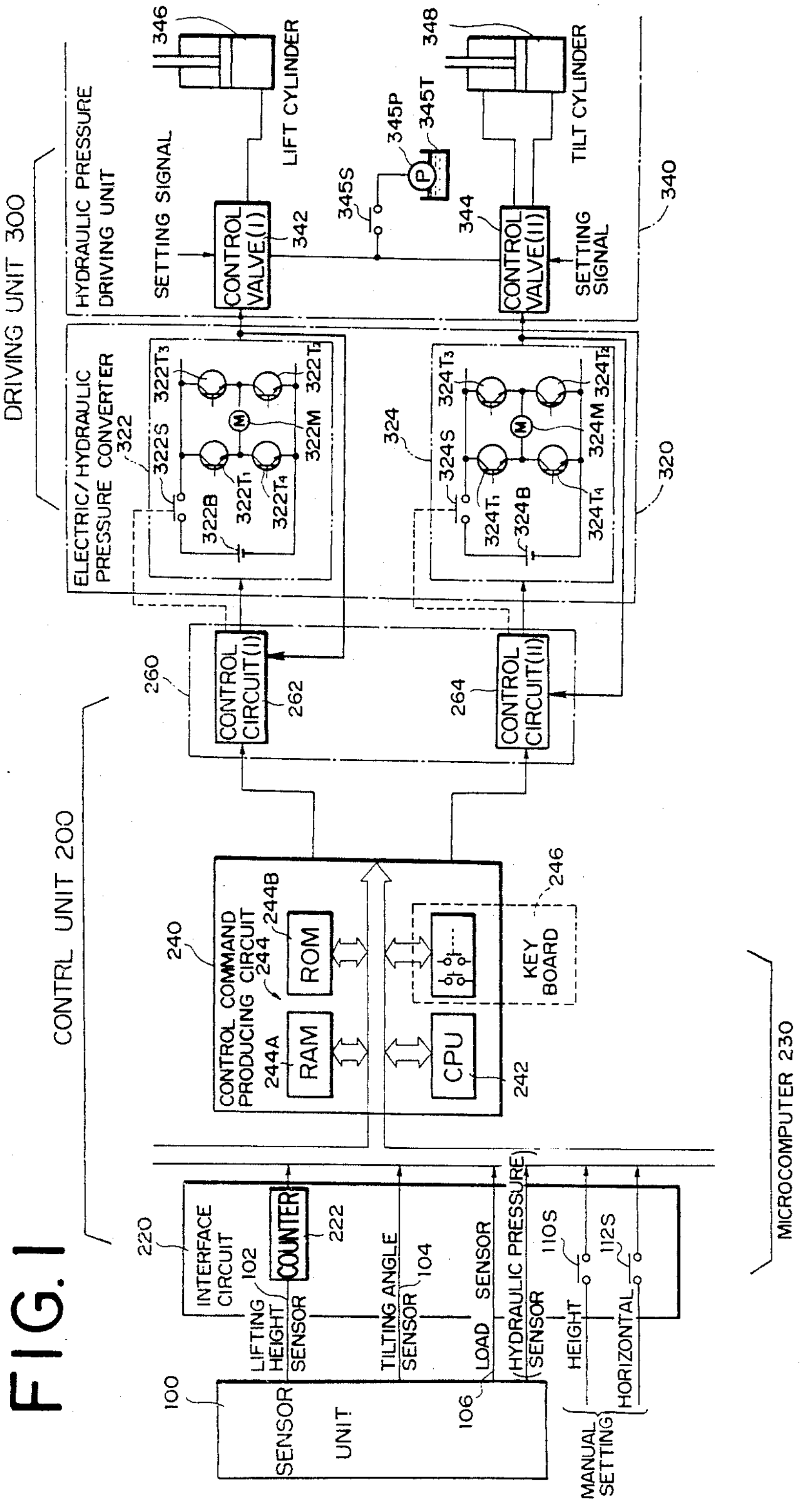
FIG. 1 is a block diagram schematically illustrating a system construction of a control device for a loading and unloading mechanism according to the present invention.

FIG. 1 is a block diagram illustrating a system construction of a control device for a loading and unloading mechanism according to the present invention.

Reference numeral 100 denotes a sensor unit including a lifting height sensor 102, a tilting angle sensor 104, and a load sensor 106 (hydraulic pressure sensor). Reference numeral 200 denotes a control unit which comprises an interface circuit 220 including a lifting height counter 222, a control command producing circuit 240 constituted by a microcomputer 230 responsive to the output of the sensor unit 100 fed through the interface circuit 220, and a control circuit 260 responsive to a control command produced by the control command producing circuit 240. Reference numerals 110S and 112S denote contacts for manual setting, which are closed by external commands indicative of lifting height and the horizontal position of the fork, respectively.

More particularly, the control command producing unit 240 comprises a central processing unit (CPU) designated by reference numeral 242, a memory 244 essentialy consisting of a random access memory (RAM) designated by reference numeral 244A, a read only memory (ROM) designated by reference numeral 244B in which predetermined lifting height, tilting angle, load, or other data input, or data are stored, and data setting means 246, as for example, comprising a key board for setting desired data by an operator. The control command producing circuit 240 produces a control command based on the ouput of the sensor unit 100 and the data in connection with lifting height, tilting angle, or load stored in the memory 244. The control circuit 260 comprises a first control circuit 262 for lifting height control system and a second control circuit 264 for tilting angle control system.

Reference numeral 300 denotes a driving unit comprising an electric/hydraulic pressure converter 320 and a hydraulic pressure driving unit 340. The electric/hydraulic pressure converter 320 comprises first and a second actuators 322 and 324 responsive to the output of the first and second control circuits 262 and 264, respectively. The first actuator 322 comprises a servomotor driving circuit (referred to later) essentially consisting of switching transistors 322$T_1$ to 322$T_4$ constituting an inverter for controlling a driving motor 322M, and a contact 322S for connecting a DC power supply 322B to the inverter on the basis of the command fed from the first control circuit 262, and a link mechanism (not shown) for joining the output shaft (not shown) of the driving motor 322M to a lift valve member referred to soon. Likewise, the second actuator 324 comprises a servomotor driving circuit (referred to latter) essentially consisting of switching transistors 324$T_1$ to 324$T_4$ constituting an inverter for controlling a driving motor 324M, and a contact 324S for connecting a DC power supply 324B to the inverter on the basis of the command fed from the second control circuit 264, and a link mechanism (not shown) for joining the output shaft (not shown) of the driving motor 324M to a tilt valve member referred to soon. The hydraulic pressure driving unit 340 comprises first and second control valves responsive to the first and the second actuators 322 and 324, respectively. The first control valve 342 is connected to a lift cylinder 346 for controlling a lifting height while the second control valve 344 is connected to a tilt cylinder 348 for controlling a tilting angle. Between the first and second control valves 342 and 344, there is provided a hydraulic pump 345P for supplying a suitable hydraulic oil thereto. Reference numeral 345T denotes a hydraulic oil tank. Reference numeral 345S denotes a contact provided in an electromagnetic valve (not shown) for feeding and interrupting a hydraulic oil fed from the hydraulic pump 345P in accordance with an external command. The above-mentioned first control circuit 262, the first actuator 322, the first control valve 342, and the lift cylinder 346 constitute a servo control circuit for lifting height control system. Likewise, the above-mentioned second control circuit 264, the second actuator 324, and the second control valve 344, and the tilt cylinder 348 constitute a servo control circuit for tilting angle control system.

Figure 2:
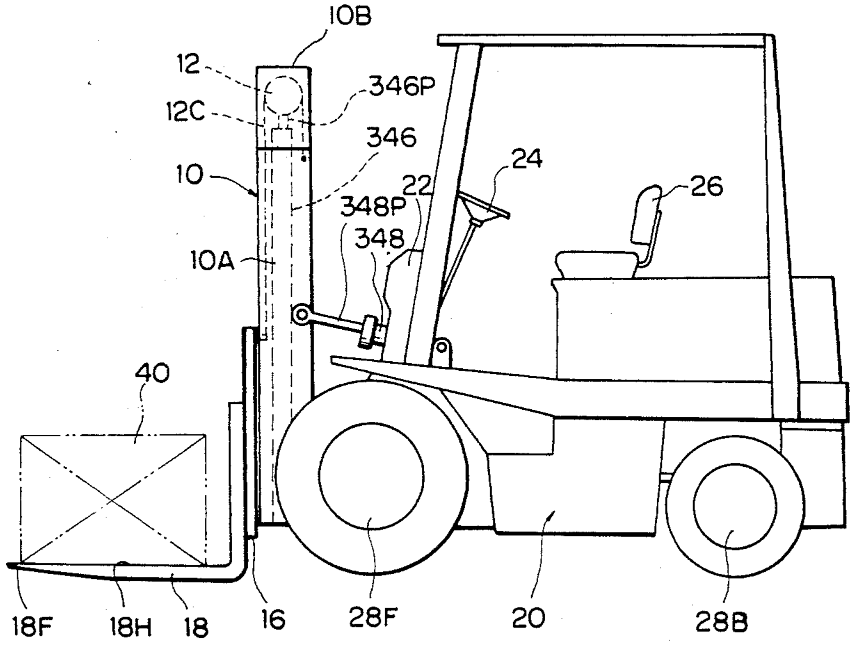
FIG. 2 is a side view illustrating a fork lift truck to which the present invention is applied.

FIG. 2 shows a fork lift truck to which the control device for loading and unloading mechanism according to the present invention is applied. Reference numeral 10 denotes a pair of uprights provided on the right and left sides, each comprising an outer mast 10A and an inner mast 10B suported by the outer mast 10A so as to move in the upper and lower directions. The lower end portion of the outer mast 10A is mounted on the front side of a truck body 20 so as to fluctuate. Reference numeral 348 denotes the above-mentioned tilt cylinder mounted to the front portion of truck body 20. A piston 348P of the tilt cylinder 348 is joined to the outer mast 10A so that the tilting angle in the forward and backward directions of the upright 10 can be adjusted. Reference numeral 346 denotes the above-mentioned lift cylinder mounted on the central portion between the pair of uprights 10A, wherein the piston 346P thereof is joined to the inner mast 10B through a chain wheel supporter 10S (shown in FIG. 3) so that the height of the inner mast 10B in the upper and lower directions can be adjusted. Reference numeral 12 denotes a chain wheel rotatably mounted on the upper end of the piston 346P. A chain 12C is fitted over the chain wheel 12. The one end of the chain 12C is joined to the outer mast 10A or the lift cylinder 346. The other end of the chain 12C is joined to a movable member 16 slidably fitted into the inner mast 10B or a fork 18 supported by the movable member 16.

Reference numeral 18F denotes a top portion or free end of the fork 18. A load designated by reference numeral 40 is mounted on a horizontal portion 18H of the fork 18. Reference numeral 24 denotes a steering wheel for usual running. Reference numeral 26 denotes a seat for an operator. Reference numerals 28F and 28B denote a front wheel and a rear wheel, respectively.

Figure 3:
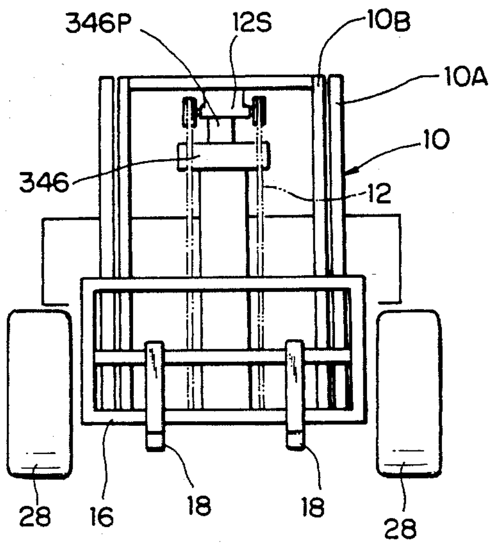
FIG. 3 is a front view of the fork lift truck shown in FIG. 1.
Figure 4:
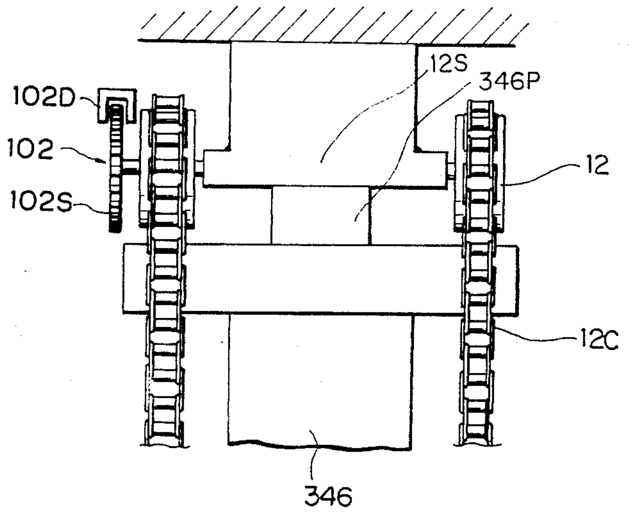
FIG. 4 is an enlarged view of a fork lift truck shown in FIG. 3 into which a lifting height sensor is incorporated.

Accordingly, when the lift cylinder 346 becomes operative, the inner mast 10B elevates. According to this movement, the fork 18 which is pulled by the chain 12C moves upwards along the inner mast 10B. As a result, a load 40 mounted on the fork 18 is lifted. FIG. 3 is a front view of a fork lift truck shown in FIG. 2. FIG. 4 is a partly enlarged view of FIG. 3. In these drawings, the same reference numerals used in FIG. 2 denote corresponding parts, which explanation is omitted. FIG. 4 shows a detail of the above-mentioned lifting height sensor 102. The lifting height sensor 102 comprises a disk 102S having a plurality of slits coaxially mounted to the chain wheel 12 and a sensor unit 102D, which may be an electromagnetic type, in the embodiment, for instance, consisting of a light source and a light detector (not shown). The slitted disk 102S rotates in accordance with the rotation of the chain wheel 12. The number of the slits is detected by the sensor unit 102D. More particularly, the sensor unit 102D produces a pulse signal corresponding to the number of the slits, thereby detecting the lifting height.

Figure 5:
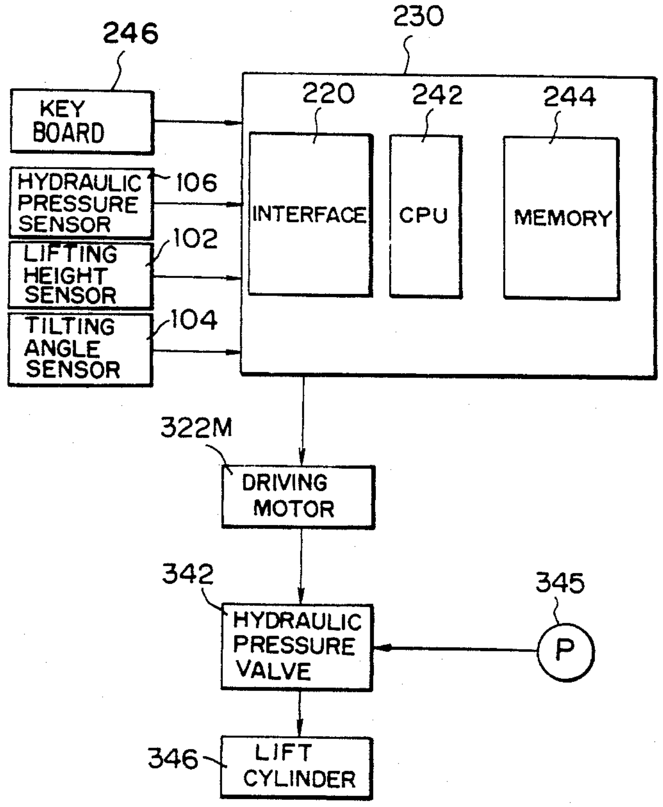
FIG. 5 is a block diagram illustrating a first embodiment of a control device for a loading and unloading mechanism according to the present invention.

As stated above, the fork lift truck shown in FIGS. 2 to 4 is automatically loaded and unloaded with the control device for loading and unloading mechanism controlled by the microcomputer 230 shown in FIG. 1. FIG. 5 shows a block diagram simplified for an explanation, wherein the same reference numerals shown in FIG. 1 denote corresponding constituent members. The address of the memory 244 is designated by the key operation of the key board 246, thereby storing the lifting height data therein. The above-mentioned load sensor 106 is constituted usually as a hydraulic pressure sensor for hydraulic oil of the lift cylinder 346. When the load 40 is not mounted on the fork 18, that is, in the unloaded condition, the hydraulic pressure sensor 106 inputs a logical output "0" to the microcomputer 230. On the contrary, when the load 40 is mounted on the fork 18, that is, in the loaded condition, the hydraulic pressure of the lift cylinder 346 increases. When the load 40 is above the predetermined value, the hydraulic pressure sensor 106 inputs a logical output "1" to the microcomputer 230. The pulse output from the lifting height sensor 102 is fed to the microcomputer 230. The operation of this instance is as follows: The pulse output being fed from the lifting height sensor 102 is counted by the lifting height counter 222 shown in FIG. 1, although now shown in FIG. 5. A predetermined calculation is effected in CPU 242 on the basis of the counted value. The calculated lifting height is displayed on a display (not shown) provided on the key board 246.

In the above-mentioned automatic lifting height device, the microcomputer 230 drives the control valve 342 through the driving motor 322M so that the control command value is equal to a control value previously stored on the basis of the information from the lifting height sensor 102, thereby actuating lift cylinder 346.

It is necessary to move the fork 18 to the predetermined height when the lifting height data is stored in memory 244 of the microcomputer 230 with the key board 246. In this instance, if the fork 18 is lifted to the maximum height, the hydraulic pressure of the lift cylinder 346 increases even in the unloaded condition. As a result, the hydraulic pressure sensor 106 is turned on. The microcomputer 230 erroneously recognizes that it is a loaded condition. For this reason, even if an operator attempts to store the lifting height data in the unloaded condition into the microcomputer 230 by the actuation of the key board 246, the data is automatically stored in the address allotted to the loaded condition. As a result, there occur inconveniences or serious errors in the automatic lifting control either in the unloaded or loaded conditions. Further, the lifting height data may be assumed to be stored in the microcomputer 230 under the condition that the fork 18 may be assumed to be lowered to ground. When the thickness of the horizontal portion 18H of the fork 18 is large as compared with a coventional fork, even if attempting to lower the fork 18 to stored position corresponding to ground by effecting an automatic lifting height control, it is actually impossible to lower the fork 18 to that position. For this reason, there is drawback that the command indicative of lowering of the fork 18 is continuously fed from the microcomputer 230, thereby disabling a shift to the subsequent operation.

Figure 6:
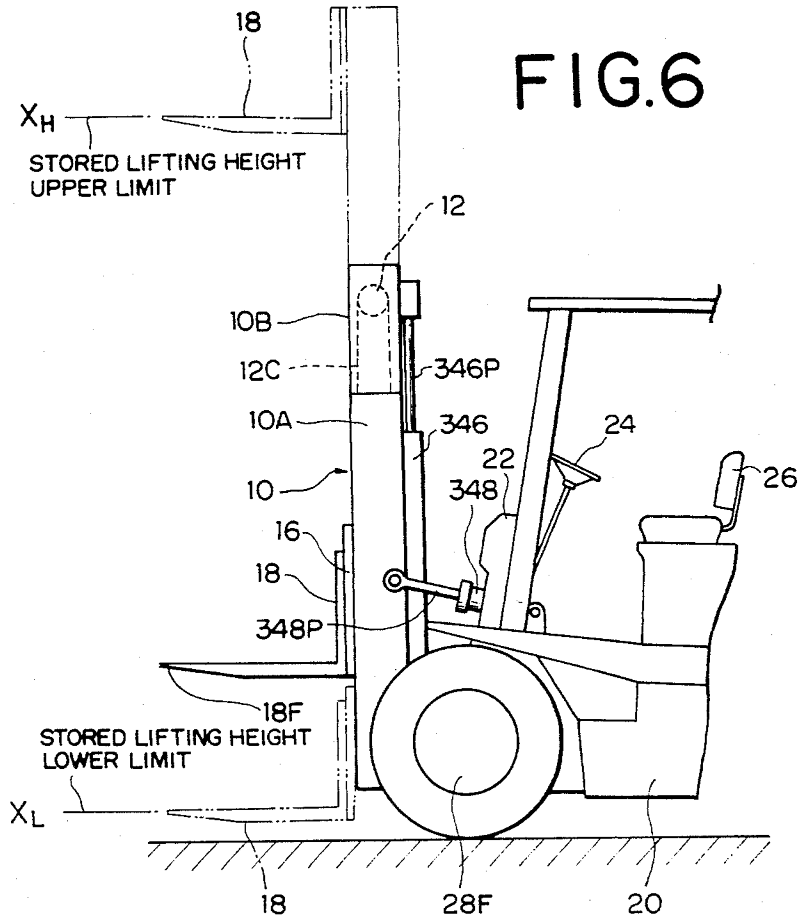
FIG. 6 is a side view illustrating a fork lift truck to which the control device of FIG. 5 is applied and explaining how to set the stored lifting height upper and lower limits.

The first embodiment of the present invention has solved these problems, which will be explained with reference to FIG. 5. The upper limit and the lower limit to be stored are set in the microcomputer 230 as shown by labels $X_H$ and $X_L$ in FIG. 6. In this instance, the upper limit to be stored is selected so that it is slightly lower than the lifting height at which the load sensor 106 associated with the lift cylinder 346 provides an output in the unloaded condition, while the lower limit to be stored is selected so that it is slightly higher than that of maximum value of the thickness of the horizontal portion 18H of the fork 18. The microcomputer 230 executes a program based on a flow chart shown in FIG. 7. At the step $S_1$, the appropriate memory routine for controlling various kinds of controls required for, such as the lifting height control of the fork 18, stored in ROM 244B of the microcomputer 230, is found in the main loop of the program. If the memory routine is found by looking-up, at the step $S_2$ the specific memory routine is called. At the step $S_3$, a comparison is effected between the stored upper limit of the lifting height value and the present lifting data obtained from the lifting height sensor 102. At the step $S_4$, if the result is minus, that is, the present lifting height value is above the stored upper limit of the lifting height, the execution of the program is returned to the main loop at the step $S_1$, for a second time. On the contrary, if the result is equal to zero or plus, that is, the present lifting height value is lower than the stored upper limit of the lifting height, the execution of the program is shifted to the step $S_5$. At the step $S_5$, the comparison between the lower limit of memory previously stored and the present lifting height value is further effected. At the step $S_6$, if the result is equal to zero or plus, that is, the present lifting height value is lower than the lower limit of the memory or equal thereto, the program execution is returned to the main loop at the step $S_1$, for a second time. On the contrary, if the result is minus, the present lifting height value is higher than the lower limit of the memory, the program execution is shifted to the step $S_7$. At the step $S_7$, the signal "memory OK" showing that it is possible to store the lifting height data is transferred to the memory subroutine. Thus, it is possible to store the desired target lifting height value in the microcomputer 230.

Figure 7:
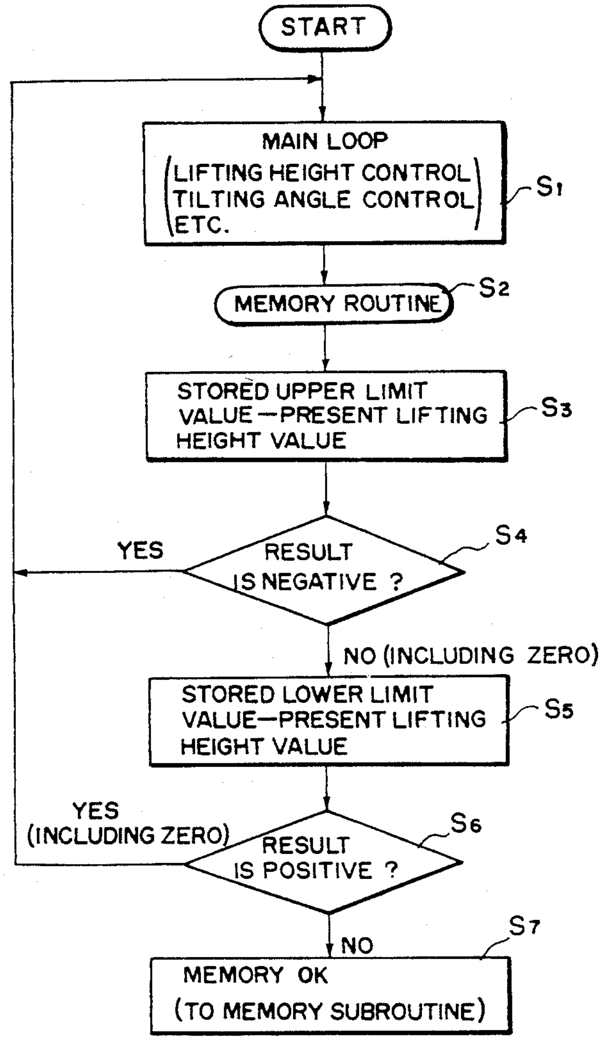
FIG. 7 is a flow chart for checking lifting height data stored in a microcomputer incorporated in the control device of FIG. 5.
Figure 8:
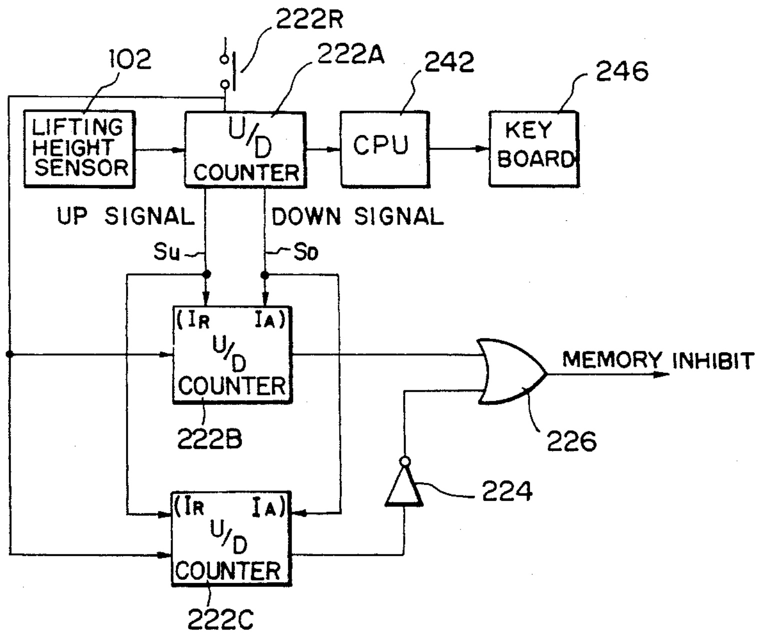
FIG. 8 is a block diagram illustrating a checking circuit for enbodying the function indicated by the flow chart of FIG. 7.

FIG. 8 is a block diagram for effecting the above mentioned control based on the program shown in FIG. 7. As stated above, the lifting height counter 222 is provided at the interface 220 shown in FIG. 1. In the embodiment, the lifting height counter 222 comprises three up-down counters 222A, 222B and 222C. The first counter 222A counts pulse output fed from the lifting height sensor 102. The CPU 242 effects calculation based on the counted value to produce a signal indicative of lifting height. The corresponding lifting height data is displayed on the key board 246. In order to preset the above-mentioned upper and lower limits, there are provided the second counter 222B for presetting the upper limit of the lifting height, for instance, 2.8 m and the third counter 222C for presetting the lower limit, for instance, 8 cm.

A reset switch 222R is switched on under the condition that the fork 18 is placed on ground. Thereby, the first counter 222A is cleared and the upper and lower limits of lifting height are set to the second and third counters 222B and 222C. Then, the lifting height operation of the fork 18 is effected to move the fork 18 in the upward and downward directions. According to this operation, the first counter 222A effects up-counting at the time of elevation of the fork 18 to feed an up-signal labelled by Su to the subtracting input terminals $I_R$ of the second and third counters 222B and 222C. Thus, a reduction is effected in the count of the second and third counters 222B and 222C. Likewise, at the time of lowering of the fork 18, the first counter 222A effects a down-count to deliver the down-signal labelled by $S_D$ to each adding input terminal $I_A$ of the second and third counters 222B and 222C. Thus, addition is effected in the second and third counters 222B and 222C. Accordingly, when the lifting height value of the fork 18 is above the stored upper limit, the count of the second counter 222B is minus to produce a logical output "1". On the contrary, when the lifting height value of the fork 18 is higher than the stored lower limit, the count in the third counter 222C is minus to produce a logical output "1". On the other hand, when the fork 18 reaches the position equal to the stored lower limit or lower than that, the output of the third counter 222C is "0". The output of the third counter 222C is inverted by the NOT gate 224. As a result, the logical signal "1" is fed to the OR gate 226. Thus, when the fork 18 is above the stored upper limit, equal to or below the stored lower limit, either of the input of the OR gate 226 is "1". As a result, the OR gate 226 produces a memory inhibiting signal, even if the operator attempts to set a memory of lifting height to the microcomputer 230 with the key board 246, thereby making it impossible to store a lifting height data.

According to the first embodiment of the present invention, when the position of the fork 18 is above the upper limit previously stored in the microcomputer 230, or below the lower limit stored therein, that is, the fork 18 is not within the range of permitted lifting heights, the memory setting of the lifting height data is inhibited. Accordingly, the data stored in the microcomputer 230 by memory-setting of the lifting height data in the unloaded condition is not erroneously identified with the value stored in the loaded condition. Even if the automatic lifting height control is effected with a fork lift truck having a fork of which thickness is large, there does not occur the situation in which the fork 18 cannot be lowered to the lifting height previously set, thereby making it possible to smoothly effect the automatic lifting height control.

Figure 9:
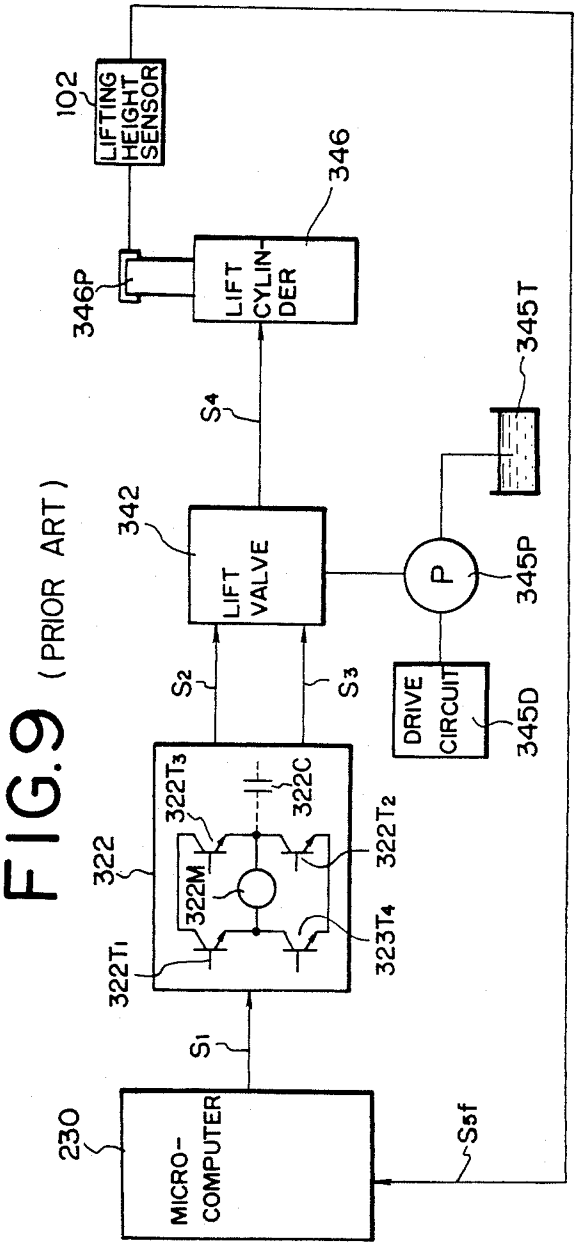
FIG.9 (PRIOR ART)
FIG. 9 is a block diagram illustrating a conventional lifting height control device for loading and unloading mechanism.

Reference is made to the second embodiment of the present invention. The second embodiment has solved the problem occuring when a lifting height speed control is effected by controlling a servo driving system for actuating a lift cylinder. For better understanding of the second embodiment, the method of controlling the lifting height speed will be described with reference to FIG. 9. Reference numeral 322 denotes the above-mentioned first actuator which becomes operative in accordance with a command signal $S_1$ indicative of opening angle fed from the microcomputer 230. As stated above, the actuator 322 comprises a driving motor 322M, and transistors 322$T_1$ to 322$T_4$. Additionally, there is provided a clutch 322C. The valve opening angle of the first control valve 342 is controlled by correction signals $S_2$ and $S_3$ fed from the actuator 322. The lift cylinder 346 is controlled by an output signal $S_4$ fed from the first control valve 342. Thereby, the piston 346P becomes operative to effect a lifting height control. Reference numerals 345T and 345P denote hydraulic oil tank and hydraulic pump, respectively. Reference numeral 345D denotes a driving circuit for the hydraulic pump 345P. The driving circuit 345D comprises, for example, an engine or a motor. According to the device thus constructed, (mainly, within the region of medium and low speeds) the follow-up control of the lifting speed (or lowering speed) to the predetermined value is effected by adjusting the opening angle of the first control valve 342 through the driving motor 322M and the clutch 322C. The setting speed is stored in the microcomputer 230 with the above-mentioned data setting means 246 such as a key board. The stored setting speed is compared with an actual speed signal $S_{5f}$, shown as being fed to the microcomputer from the lifting height sensor 102. The command signal $S_1$, indicative of valve opening angle corresponding to the deviation based on the comparison, is fed to the actuator 322 to control the driving motor 322M. The opening angle of the first control valve 342 is corrected by the correction signals $S_2$ and $S_3$ fed from the actuator 322. The lift cylinder 346 is actuated by the control signal $S_4$ to effect a lifting height speed control.

With the above-mentioned arrangement, there exists a response delay. After a correction signal for increasing speed is produced, it takes 10 milliseconds or 100 milliseconds until the driving motor 322M rotates to open the valve to provide the result of actually increasing the lifting speed. Another drawback is pointed out as follows: The valve opening angle command for increasing the speed is continuously fed to the driving motor 322M until the actual lifting speed reaches the setting value newly set for increasing a speed. Particularly, in this instance, in the region where the valve opening angle is small, the change of the speed with respect to the valve opening angle command is abrupt. Accordingly, the speed of the driving motor 322M abruptly increases to increasingly open the first control valve 342, with the result that the lift cylinder 346 is quickly elevated. When the actual lifting height speed reaches the setting value, the deviation is equal to zero. At the same time, when the command for stopping the driving motor 322M is fed to the actuator 322, the driving motor 322M is stopped under the condition that the predetermined inertia is applied thereto. Accordingly, the valve opening angle at that time is larger than that corresponding to the setting lifting height speed by the inertia. As a result, the actual lifting height speed is too high as compared with the lifting speed setting. Accordingly, the equilibrium between the speed sensed by the lifting height sensor 102 and the speed setting is broken. As a result, the valve opening angle command $S_1$ due to the deviation having a minus polarity is produced from the microcomputer 230. There occurs an inverse operation in the direction of closing the first control valve 342. From the time when the command for stopping the driving motor is produced, the speed of the lift cylinder 346 gradually attenuates varying or vibrating in the plus and minus directions under the condition that the changed lifting height speed serves as a boundary, and then reaches the predetermined lifting height speed after the predetermined time passes.

As stated above, the drawbacks of the prior art lifting height speed control are pointed out as follows: There is lacking a smoothness and stability when effecting a speed control due to the vibration of the lifting height speed when the setting value is altered, in addition to the response delay.

Figure 10:
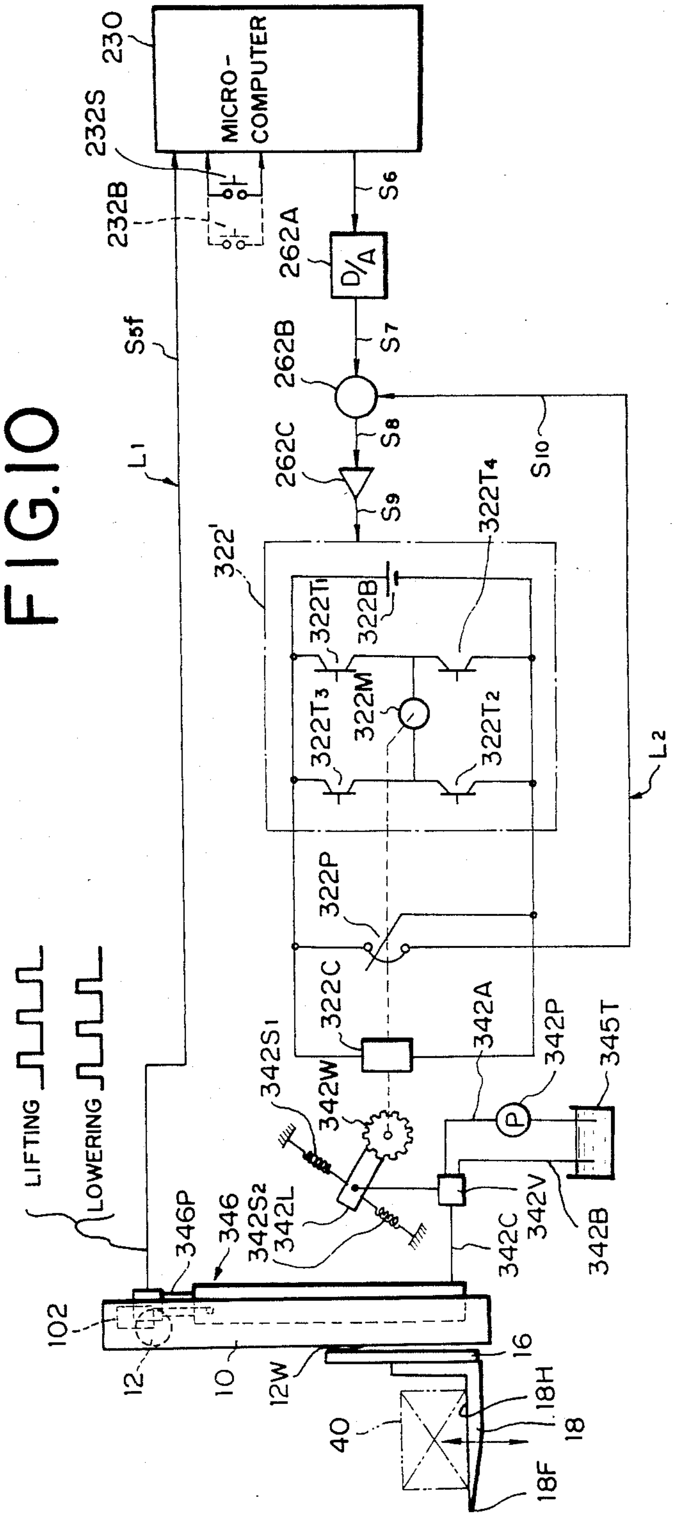
FIG. 10 is a block diagram illustrating a second embodiment of a control device for loading and unloading mechanism according to the present invention.

The second embodiment which will be described with reference to FIG. 10, has solved these problems. In FIG. 10, the same reference numerals denote corresponding parts, respectively, as in the other figures and accordingly an explanation thereof is omitted.

In the automatic speed control system, a major loop for lifting height speed control is labelled by $L_1$ and a minor loop for valve opening angle is labelled by $L_2$. Reference numeral 262A denotes a digital to analog converter (D-A converter) for converting a digital command signal $S_6$ fed from the computer 230 to an analog signal indicative of the valve opening angle setting signal $S_7$. Reference numeral 262B denotes a comparing circuit for comparing the setting signal $S_7$ with a sensed voltage of the servomotor driving circuit referred to soon. Reference numeral 262C denotes an amplifier for amplifying the difference output signal $S_8$ fed from the comparing circuit 262B. The driving motor 322M becomes operative in accordance with the amplified signal $S_9$ fed from the amplifier 262C. Reference numeral 322P denotes a potentiometer cooperative with the driving motor 322M. The feed back signal $S_{10}$ fed from the potentiometer 322P is fed to the comparing circuit 262B. Reference numeral 342W denotes a toothed wheel which becomes operative in cooperation with the clutch 322C. Reference numeral 342L denotes a lever fixed to the axle of the toothed wheel 342W. The lever 342L is mounted to the one end of the springs $342S_1$ and $342S_2$. The other end of each of the springs $342S_1$ and $342S_2$ is fixed to a stationary member (not shown). A spool (not shown) for opening and closing the valve, which communicates with the conduit 342C, is disposed within a valve unit 342V. The spool is joined to the lever 342L.

With the above mentioned lifting height control device, the digital command signal $S_6$ fed from the microcomputer 230 is converted into an analog signal by the D/A convertor 262A. The analog signal serving as a valve opening setting signal $S_7$ is fed to the comparing circuit 262B. The servomotor driving circuit 322' becomes operative in accordance with the amplified signal $S_9$ due to the deviation between the valve opening angle setting signal $S_7$ and the feed back signal $S_{10}$. Thus, the predetermined rotational angle of the driving motor 322M is determined. That is, when in accordance with the amplified signal $S_9$ corresponding to the valve opening setting signal $S_6$, the transistors $322T_1$ and $322T_2$ become operative, the driving motor 322M rotates in the forward direction. Conversely, when the transistors $322T_3$ and $322T_4$ become operative, the driving motor 322M rotates in the backward direction. According to the rotational angle of the driving motor 322M, the lever 342L is rotated through the clutch 322C and the toothed wheel 342W. Thus, the valve opening angle is determined. As a result, the moving speed of the piston 346P of the lifting cylinder 346 is determined. According to the moving speed of the piston 346P, the pulse signal $S_{5f}$ fed from the lifting height sensor 102 constituted as a pulse generator is fed to the microcomputer 230.

The predetermined speed setting signal is set in the memory 244 of the microcomputer 230. The microcomputer 230 effects a comparing calculation between the actual speed of the piston 346P and the speed setting to output the digital command signal $S_6$. The D/A converter 262A produces a voltage proportional to the command signal $S_6$ to feed it to the comparing circuit 262B. In the comparing circuit 262B, the comparison between the voltage ($S_7$) and the feed back signal $S_{10}$ is effected. The control of the valve opening angle is effected under the condition that the output of the comparing circuit 262B serves as a control command of the minor loop. Thus, the lifting height control is effected in accordance with the above-mentioned operation.

Figure 12:
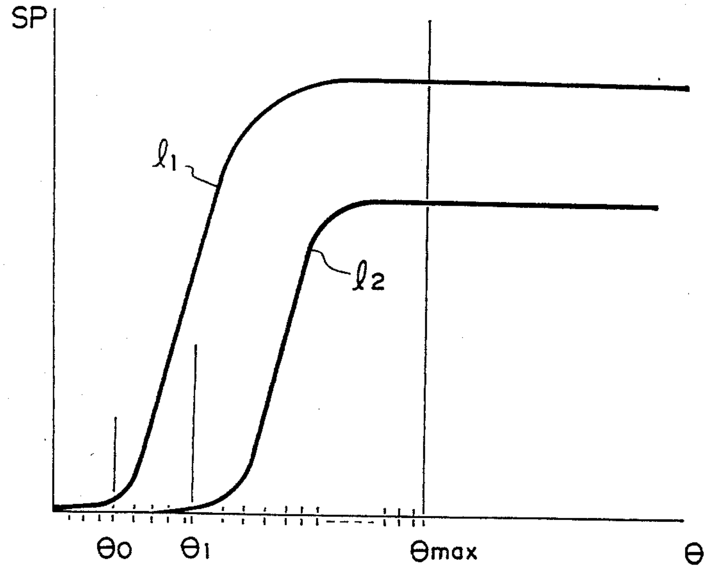
FIG. 12 illustrates a speed characteristic curve of a fork when a lifting height control is effected with the control device shown in FIG. 10.

The speed of the fork 18 is shown as curves $l_1$ and $l_2$ in FIG. 12 where Symbol $l_1$ denotes a characteristic curve in the unloaded condition, and $l_2$ a characteristic curve in the loaded condition. As understood from FIG. 12, the fork 18 is not elevated at the opening angle of $\theta_0$ even in the unloaded condition. At the angle of $\theta_1$, the lifting speed is placed in full speed condition in the unloaded condition, while in the loaded condition, the fork 18 does not move it all. At the angle of $\theta$max. which is maximum opening degree, the lifting speed thereof is placed in full speed condition in the loaded condition. For this reason, in the present embodiment, it is designed that the angle ranging from $\theta_0$ to $\theta$max. is divided into a multiplicity of steps, for instance 50 steps, to output a command signal corresponding to the opening angle of the valve from the microcomputer 230.

Figure 11:
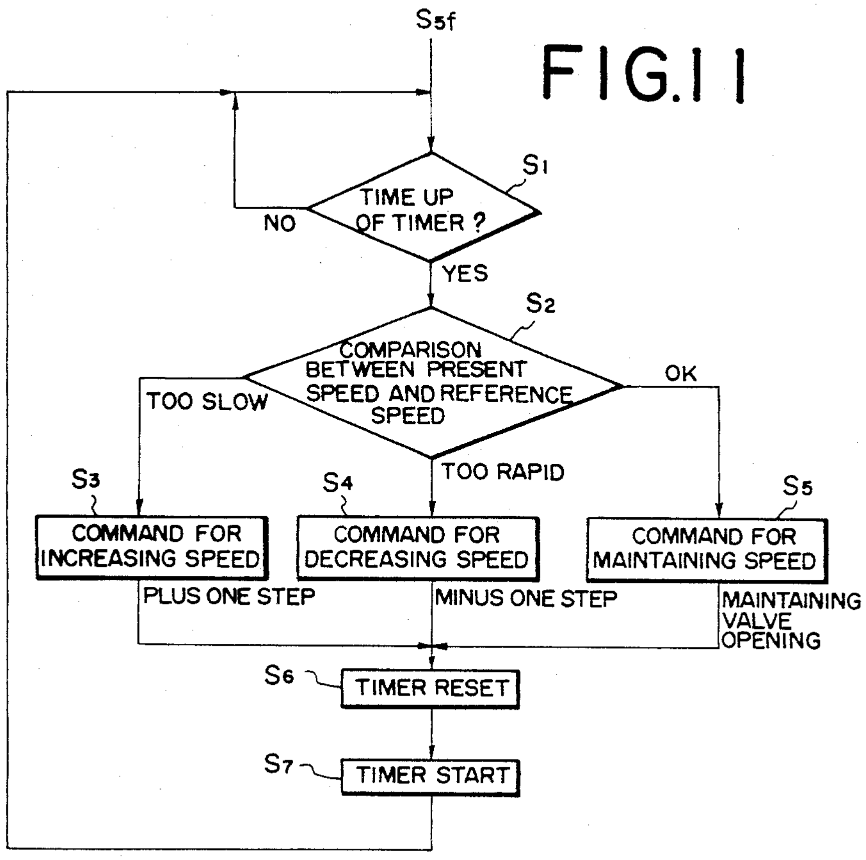
FIG. 11 is a flow chart for effecting a lifting height control with the control device shown in FIG. 10.

FIG. 11 is a flowchart showing an execution of the program of the microcomputer 230.

When the signal $S_{5f}$ indicative of the speed sensing is fedback to the microcomputer 230, at the step $S_1$, it is determined whether a predetermined time interval has elapsed. If the predetermined time has not elapsed, the program execution is returned to the step $S_1$ for a second time.

If the predetermined time interval, e.g. 20～30 milliseconds set in a timer has elapsed, the comparison between the present speed and the reference speed is effected at the step $S_2$. If the present speed is not larger than the reference speed, the execution is shifted to the step $S_3$ to deliver a command for increasing the speed by plus one step. When the present speed is larger than the reference speed, the program execution is shifted to the step $S_4$ to produce a command for decreasing speed by minus one step. When the present speed is equal to the reference speed, the command for maintaining the present condition is produced at the step $S_5$. When the program execution at the step $S_3$, $S_4$ and $S_5$ is completed, the timer resetting operation is effected at the step $S_6$. Thereafter, the timer starting operation is effected at the step $S_7$. The program execution is returned to the step $S_1$. The same procedure will be repeated.

The program execution for comparing the speed setting value and the present speed in the microcomputer 230 is stated above. Turning now to FIG. 11, the operation of the lifting height speed control device according to the present embodiment is described.

Let it be assumed that the correction of the lifting height speed is effected under the condition that the fork 18 is controlled at the predetermined lifting height speed.

Figure 13:
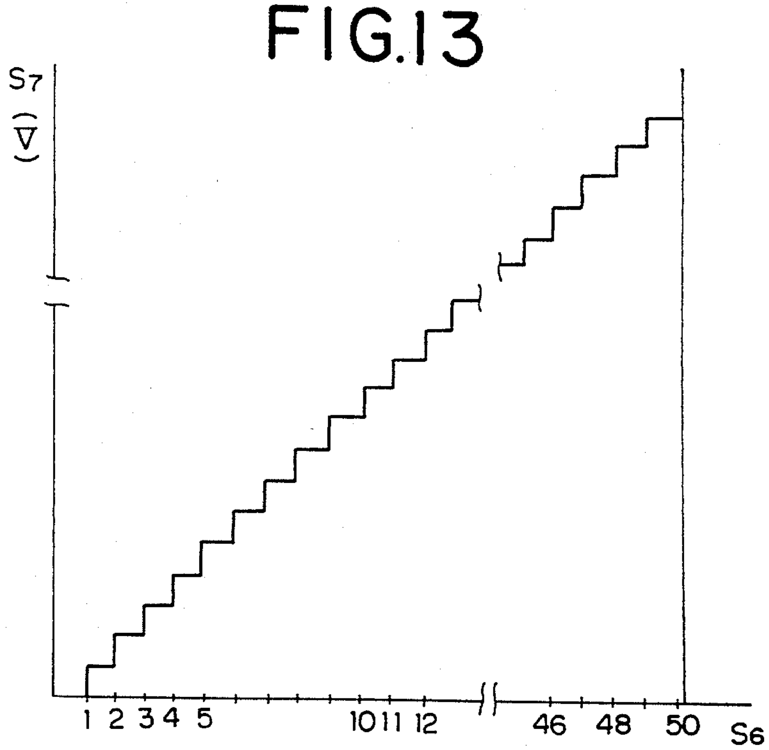
FIG. 13 is a graph illustrating valve opening angle setting signal with respect to command signal fed from a microcomuter employed in the control device shown in FIG. 10.

When the speed sensing signal $S_{5f}$ corresponding to the moving speed of the piston 346P obtained by the lifting height sensor 102 is fed to the microcomputer 230, the judgement as to whether the predetermined time set by the timer passes or not is effected in accordance with the flowchart shown in FIG. 11. Thereafter, the comparison between the speed setting and the present speed is effected. If the present speed is less than the speed setting as shown in FIG. 10 the microcomputer 230 produces the binary coded command signal $S_6$ for increasing the speed by plus one step. If the present speed is above the setting signal, the microcomputer 230 produces the coded command signal $S_6$ for decreasing the speed by minus one step. If the present speed is equal to the setting signal, the microcomputer 230 produces the coded command signal $S_6$ for maintaining the speed. In the D/A converter 262A, the command signal $S_6$, which is a coded signal, as for example 0 to 50 in FIG. 13 is analog-converted to produce a voltage signal corresponding thereto. This voltage signal serves as a valve opening angle setting signal $S_7$. As stated above, the valve opening setting signal $S_7$ is rendered to the minor loop $L_2$ as the control command. Thus, the first control valve 342 is controlled. According to this control, the lifting height speed is controlled.

According to the second embodiment of the invention, the subsequent correction signal can be increased or decreased solely by one step increments due to the difference between the actual speed and the speed setting, in a time delay of about 10 milliseconds set by the timer after the preceding correction signal is produced. Accordingly, after the correction signal is produced and a change of the speed occurs due to the correction, the subsequent correction is effected. As a result, an excessive correction can be eliminated. Further, since the adjusting step of the valve opening angle is sufficiently small, the rotational angle of the driving motor 322M is small with respect to each correcting operation. As a result, in the stopping operation of the driving motor 322M effected due to a stopping command which is produced when the speed reaches the value setting therefor, there is little possibility that an excessive rotation of the driving motor 322M occuring due to the inertia is caused. Further, the changing step of the valve opening angle is sufficiently small, thereby making it possible to prevent the speed from being abruptly changed. Accordingly, this brings about a stabilized lifting height control.

Reference is made to the third embodiment of the invention. In this embodiment, the lifting height speed control device shown in FIG. 10 is employed. The same reference numerals used in FIG. 1 denote corresponding parts, which explanation will be omitted.

A program for an automatic lifting height control is stored in the microcomputer 230. When a push button switch 232S for starting lifting height operation is pushed, the microcomputer 230 feeds a control signal to the first control circuit 262 (see FIG. 1) in accordance with the program for lifting height control. The control circuit 262 feeds a control command indicative of valve opening angle to each base of transistors $322T_1$ to $322T_4$ constituting a servomotor driving circuit 322 to effect an ON-OFF control of these transistors. Thus, the driving motor 322M is controlled, so that the first control valve 342 is actuated similar to the above-mentioned embodiment.

As a result, the lift cylinder 346 lifts or lowers the fork in accordance with the upward and downward movement of the piston 346P of the lift cylinder 346.

The microcomputer 230 senses the lifting height and the speed of the fork 18 due to the pulse output fed from the lifting height sensor 102. On the basis of these sensing data, the microcomputer 230 executes a program for effecting an automatic lifting height control.

However, in such an automatic lifting height control device to which microcomputer 230 is applied, if an attempt is made to stop the fork 18 suddenly in a condition of the high speed while the height of the fork 18 is varied from one height to the other height and then is stopped thereat, it is likely that the load 40 mounted on the fork 18 will lose its shape. Therefore, it is desirable to slowly decelerate the fork 18. When the height of the fork 18 is changed, there occurs a necessity to lower the speed at the time of attitude of the load 40 which may easily become out of shape. In such a case, it is necessary to effect a follow-up control of the speed. There is a time delay until the lifting speed follows up to the setting value by the speed control command fed to the first control circuit 262 from the microcomputer 230. Further, the actual speed is calculated by the frequency of the pulse output, from which is sensed by the lifting height sensor 102, occuring every time the fork 18 moves for a predetermined interval. However, it takes much time to sense the lifting height speed. For this reason, there is a problem in operation of an automatic speed control immediately before the target height.

The third embodiment of the invention has solved these problems, which will be described with reference to FIG. 14 flow chart illustrating operation an embodiment of an automatic speed control immediately before attaining the target height. At the step $S_1$, the difference between the target height setting Hs and the present height Hc is calculated. At the step $S_2$, it is judged as to whether the lifting height reaches the target height setting Hs. As a result, if the present lifting height reaches the target height setting Hs, the automatic speed control is completed. On the contrary, if the present lifting height does not reach the target height setting Hs, the program execution is shifted to the step $S_3$. The data pattern in connection with the setting speed SPs with respect to the absolute value $|H|$ of the difference between the setting objective height Hs and the present height Hc is stored in the microcomputer 230. For instance, an example of the data pattern is shown by (A) and (B). At the step $S_3$, a reading operation of the speed setting SPs with respect to the absolute value $|H|$ is effected. Then, at the step $S_4$, the read operation of the present speed SPc is effected. The present lifting height is calculated by counting pulses every time the fork moves for a predetermined distance, which is obtained by the lifting height sensor 102. On the other hand, the present speed is calculated by measuring an interval of pulse duration. The measured time is as shown in FIG. 15A from the rising of the pulse train (or the falling thereof) to the subsequent rising of the pulse train (or the falling thereof). The timer pulse train as shown in FIG. 15B is preferably obtained by a software timer.

The procedure for obtaining the timer pulse train will be described with reference to FIG. 15C. First of all, at the step $S_1$, a judgment is effected as to whether the status of the sensor pulse train "1". At the step $S_2$, a waiting operation is effected for a predetermined time interval such as 1 m sec. At the step $S_3$, the timer count value is advanced by one. At the step $S_4$, the judgement as to whether the status of the pulse train is "1" at that time is effected for a second time. Until the status of the pulse train is determined to be "1", the program shown by steps $S_2$ and $S_3$ continues to be executed. When the status of the pulse train is "1", as shown in the step $S_5$, the value of the timer count is calculated. Thus, a measurement of time information is obtained.

Figure 14:
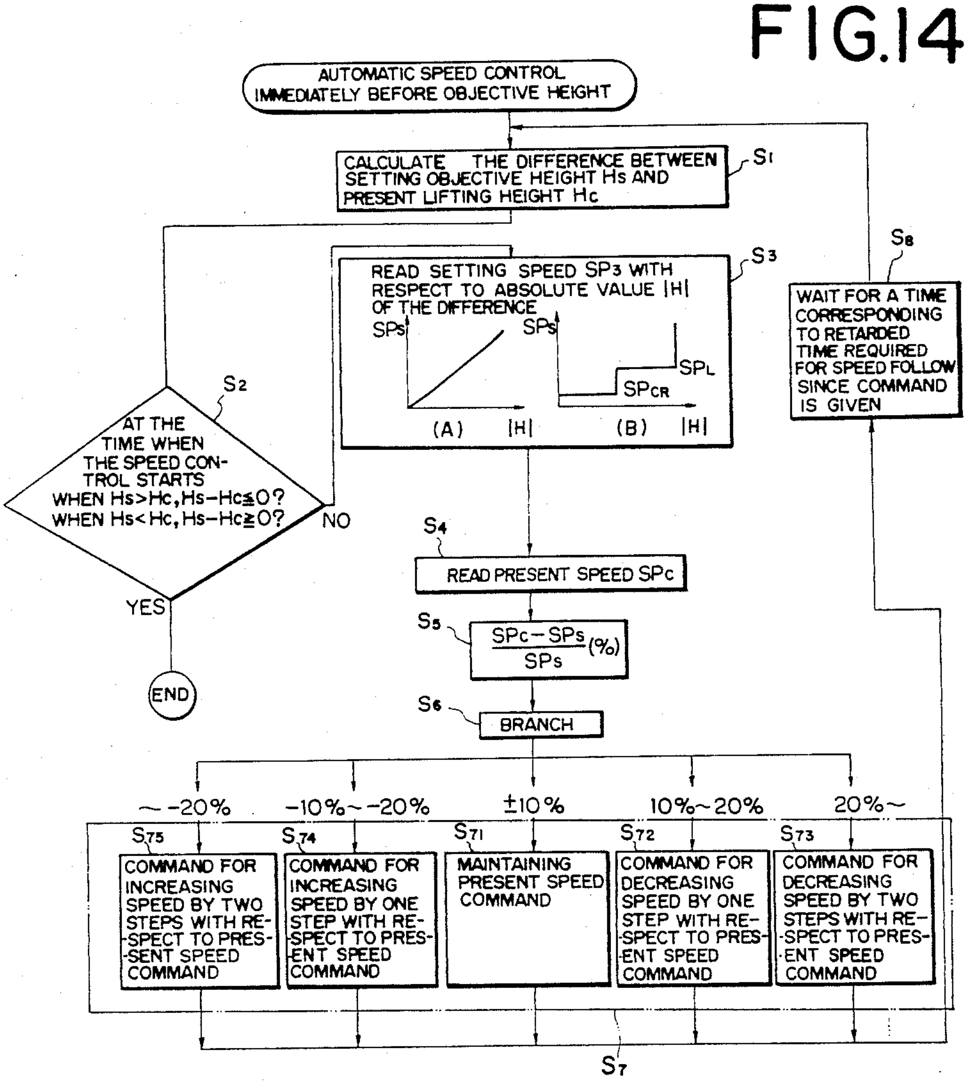
FIG. 14 is a flow chart showing an automatic speed control immediately before the objective height effected by a third embodiment of the control device for loading and unloading mechanism according to the present invention.

The processing at the step $S_4$ shown in FIG. 14 is stated above. The remaining processing for a program executed in accordance with the flow chart will be described as follows:

At the step $S_5$, $$\frac{SPc - SPs}{SPs}$$

(%) is calculated. The program execution is branched as shown in step $S_7$, in accordance with the difference, due to the branching command as shown in the step $S_6$. When the difference is small (for instance, within 10%), the maintaining present speed command is produced as shown in the step $S_{71}$. When the difference is from +10% to +20%, the command (for decreasing the valve opening angle by one step with respect to the present valve opening angle) for decreasing the speed by one step is produced as shown in the step $S_{72}$ is produced. One step is defined as one interval obtained by equally dividing the predetermined region of lift valve opening angle into multiple incremental steps, as shown in FIG. 13. When the difference is above 20%, the command for decreasing speed by two steps with respect to the present speed command by two steps as shown in the step $S_{73}$. When the difference is from −10% to −20% or above −20%, the command for increasing the speed by one step or the command for increasing the speed by two steps is produced as shown in steps $S_{74}$ and $S_{75}$, respectively. The program shown by a flow chart as shown in FIG. 14 is executed by the microcomputer 230. The speed command signals corresponding to the steps $S_{71}$ to $S_{75}$ are fed to the first control circuit 262 shown in FIG. 10 by the microcomputer 230. After a constant retarded time as shown in the step $S_8$, the program execution shown in FIG. 14 is repeated. When the constant speed control is effected, SPs shown in FIG. 14 is constant value. The speed control command as shown in FIG. 14 is produced according to the magnitude of the actual speed SPc.

As stated above, when the flow chart shown in FIG. 14 is executed, the present speed is obtained by a software timer as shown in FIGS. 15A, 15B and 15C instead of frequency of the sensor output. Accordingly, it is possible to promptly sense the present speed. For this reason, the follow-up control in the automatic speed control system immediately before the target height is effected promptly because of the fact that the sensing of the lifting height speed is quicked.

Reference is made to the fourth embodiment of the invention.

In the above mentioned fork lift truck, as shown in FIG. 2, during automatic lifting height control, when the fork 18 does not reach the objective height (object position), there occur situations in which the control is interrupted and stopped by the judgment of an operator. In the prior art, such a stopping actuation is effected with the operation of an emergency stop button or a manual lever.

However, when the actuation is effected with the emergency stop button or the manual lever, the shift operation of the spool provided in the first control valve 342 to the neutral position is abruptly effected. For this reason, the lifting or lowering speed suddenly becomes zero or suddenly various. As a result, there occurs an undesirable feeling. Alternately, the load may fall down, which may result in a serious accident.

Figure 16:
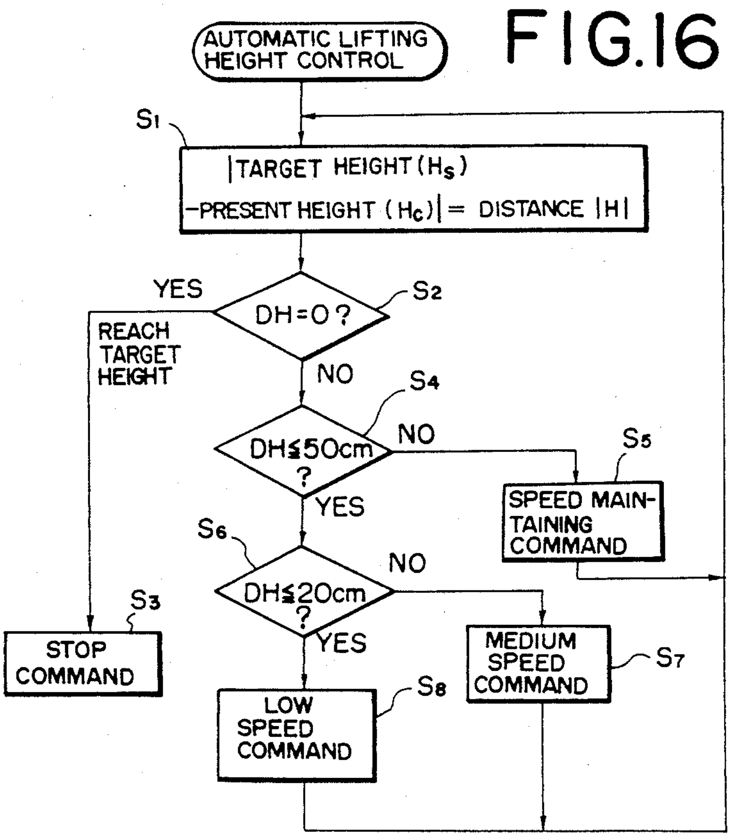
FIG. 16 is a flow chart illustrating a main program for automatic lifting height control employed in a fourth embodiment according to the present invention.

The present embodiment has solved these problems, which is explained with reference to accompanying drawings. In the present embodiment, the automatic lifting height control device used in the third embodiment is employed. FIG. 16 is a flow chart showing a main program for an automatic lifting height control.

At the step $S_1$, the absolute value $|H|$ of the difference between the target height (Hs) at which the top portion 18F of the fork 18 arrives and the present height (Hc) is detected. At the step $S_2$, the judgment is made as to whether the absolute value $|H|$ is equal to zero. If the absolute value $|H|$ is equal to zero, it is judged that the fork 18 has reached the objective height. Accordingly, as shown in the step $S_3$, the command for stopping the driving motor is produced. When the absolute value $|H|$ is not equal to zero, at the step $S_4$, the judgement as to whether the absolute value is equal to or less than 50 cm is effected. If $|H|>50$ cm, at the step $S_5$, the command for maintaining the present speed is produced. At the step $S_4$, if the absolute value $|H|$ is equal to or less than 50 cm, the program execution is shifted to the step $S_6$. At the step $S_6$, the judgement as to whether the absolute value $|H|$ is equal to or less than 20 cm is effected. If 50 cm$\geqq|H|>$20 cm, at the step $S_7$, the medium speed control command output is fed to the first control circuit 262. If $|H|\leqq$20 cm, at the step $S_8$ a low speed command, as for example, very slow control command output is fed to the first control circuit 262. Thus, the first control circuit 262 delivers the servo valve opening angle command signal corresponding to each input signal to the transistors 322$T_1$ to 322$T_4$ constituting the servomotor driving circuit 322' to control the driving motor 322M. Thus, as understood from the description stated above, the first control valve 342 and the lift cylinder 346 are controlled in accordance with the output of the servomotor driving circuit 322'. During such an automatic lifting height control, when the fork 18 does not reach the target height, there occur situation in which it is required to interrupt and stop the movement of the fork 18 according to the operator's will. In such a case, it is desirable to slowly stop the fork 18.

The operation for slowly stopping the fork will be effected as follows: (control mode)

(1) a judgement as to whether the control is effected at the high speed, medium speed, or low or very slow speed is effected.

(2) If the control is effected at the high speed, the command for the high speed is changed to the command for the medium speed.

(3) If the control is effected at the medium speed, the command for the medium speed is changed to the command for the very slow speed.

(4) If the control is effected at the very slow speed, the command for stopping the movement is produced or the command for continuing to effect the automatic control is produced.

(When the very slow control is effected immediately before the target height is reached during an automatic control, the automatic control is continued.)

(5) When the control is entered into the control for slowly stopping the driving motor, (a) the driving motor is decelerated and stopped in a predetermined retarded time on the basis of the following pattern; high speed→medium speed→very slow speed→stop (the method of changing the mode according to time).

(b) The control is effected depending on driving condition. For instance, when the control is effected at high speed, the target distance (target position) Hs is altered to the distance obtained by adding 50 cm to the present position and the command is changed so that the medium speed control is effected. If the fork is within 20 cm with respect to the target position setting, the command is changed so that the very slow control is effected and stopped at the target position.

On the other hand, if the control is effected at the medium speed, the setting is effected so that the target position Hs is 20 cm. Thus, the command is changed so that very slow speed is effected and stopped at the target position. (The method of changing the control mode according to the distance).

Figure 17:
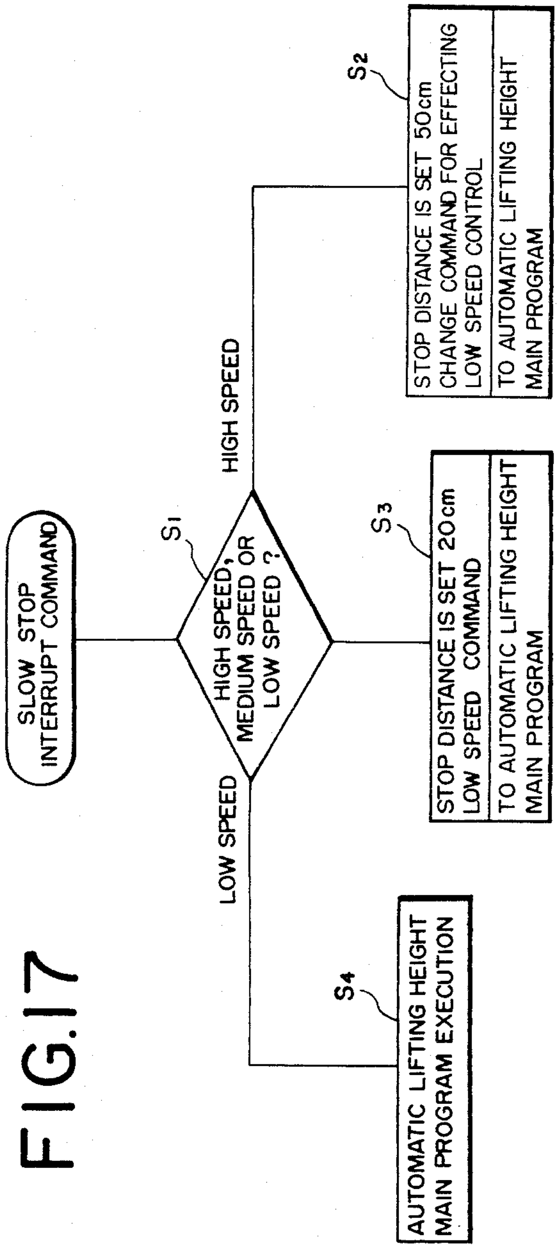
FIG. 17 is a flow chart illustrating a subroutine for a slow stop interrupting command employed in the fourth embodiment according to the invention.

Reference is made to the methods as defined in the items (1) to (4) and 5(b) with reference to FIG. 17.

Figures 18A, 18B:
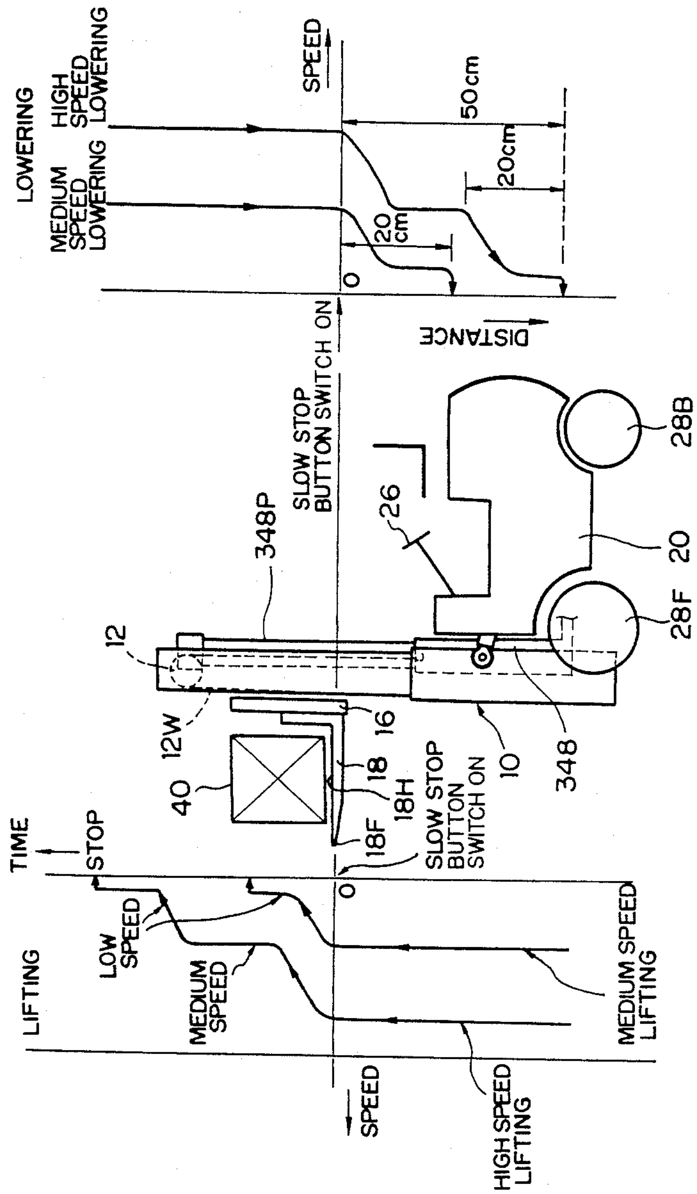
FIGS. 18A and 18B are views for explaining a lifting height operation effected with the control device of the fourth embodiment according to the invention.

A subroutine for a slow stop interrupt command, that is, the method defined in items (1) to (4) and 5(b) shown in FIG. 17, is set to the main program stored in the microcomputer 230, which is shown in FIG. 16. The microcomputer 230 is provided with a push-button switch 232B for slow stop interrupt command. When the push-button switch 232B is pushed, the slow stop interrupt command shown in FIG. 17 is produced. The microcomputer 230 judges as to whether the present speed is high, medium or low (very slow) at the step $S_1$ on the basis of the output of the lifting height sensor 102. If the speed is high, the program execution is branched to the step $S_2$. At the step $S_2$, 50 cm is entered into the target height (Hs) and the program execution is shifted to the main program for automatic lifting height. If the speed is medium, the program execution is branched to the step $S_3$. At the step $S_3$, 20 cm is entered into the target height Hs and the program execution is shifted to the main program shown in FIG. 16. If the speed is very slow, the program execution is branched to the step $S_4$. As shown in the step $S_4$, the main program for automatic lifting height in FIG. 16 is continued under the condition that the target height Hs is the same as that of the previous one. Thus, the microcomputer 230 executes the main program for automatic lifting height shown in FIG. 16 on the basis of the slow stop interrupt command shown in FIG. 17. The corresponding control command signal is fed to the first control circuit 262 from the microcomputer 230. Assuming that the fork 18 is lowering. Thus, the top portion 18F of the fork 18 is completely stopped as shown in FIG. 18A. Assuming that the fork 18 is lifting. Likewise, the fork 18 is stopped as shown in FIG. 18B.

During automatic lifting height control, when the push button switch 232B for slow stop interrupt command provided in the microcomputer 230 is switched on, the microcomputer 230 determines the distance required for the stop of the fork 18 due to the speed immediately before that time. The decelerating operation is effected by gradually lowering the setting speed until the fork 18 reaches the target height. Thus, the fork 18 is completely stopped. That is, the speed control is softly effected until the fork 18 is placed in the stopped. Accordingly, this makes it possible to eliminate a shock which may be caused when the fork 18 is stopped. As a result, there does not occur a situation in which the load 40 falls down.

According to the present embodiment, the slow stopping operation is effected with the method defined in the items (1) to (4) and 5(b). However, the present invention is not limited to this procedure. This slow stopping operation can be performed with the method defined in the items (1) to (4) and 5(a). In this instance, in stead of setting and judging due to the distance (steps $S_1$ to $S_4$ and step $S_6$ shown in FIG. 16, and steps $S_2$ and $S_3$ shown in FIG. 17), it is sufficient to use the setting and judging due to time. For instance, the lifting operation of the fork 18 is exemplified. The following procedure is applicable to the lowering of the fork 18. As shown in FIGS. 18A and 18B, due to the actuation of the push-button switch 232B, the microcomputer 230 produces a command for decreasing the speed immediately before that time by one step. The microcomputer produces a command for further decreasing the speed by one step in a predetermined time. Thus, the fork 18 is completely stopped. Since the control for stopping the fork is softly effected, the shock occuring when the fork is stopped can be eliminated. As a result, there does not occur the situation in which the load 40 falls down.

As is clear from the foregoing description, the control device according to the present embodiment has the following advantages:

During an automatic lifting height control, when a slowly stopping operation is required, the push-button switch 232B for slow stop interrupt command is pushed. Thereby, the control for stopping operation is effected by making good use of the method of decreasing the lifting speed immediately before the push button switch 232B is switched on due to time (method as shown in the item 5(a)) or the method for decreasing the same due to the distance (method as shown in the item 5(b)) set in the microcomputer 230. The suitable setting of the time and distance at the time of utilizing the above-mentioned methods makes it possible to prevent the load from falling, thereby enabling the fork and load to stop smoothly.

In FIGS. 17 and 16 embodiments in which the method featured by the item 5(b) is employed, 50 cm and 20 cm are used as the setting distance. However, the distance is not limited to this value. According to the situation of a load 40 placed on the horizontal portion 18H of the fork 18, the above selected distance of 50 cm and 20 cm can be suitably changed. On the basis of the modified value, the microcomputer 230 makes it possible to freely adjust the decelerating speed.

Reference is made to the fifth embodiment of the present invention. The present embodiment aims at stabilization of the lifting height speed control. An automatic lifting height control is effected with computer controlled device shown in FIG. 10.

In such an automatic lifting height control, if the actual lifting height speed is too quick as compared with the speed required for suitable lifting height speed control, a control signal in the direction of closing the first control valve 342 is fed to the first control circuit 262 from the microcomputer 230. As a result, if the actual lifting height speed sensed by the lifting height sensor 102 is still quick, the microcomputer 230 delivers a control signal in the direction of closing the first control valve 342. However, since the change of the speed with respect to the valve opening angle is very abrupt as shown in a characteristic curve of FIG. 19, if, for instance, the command of the valve opening angle $\theta_2$ is produced, the fork 18 is stopped. If the fork 18 is stopped, the lifting speed is too slow, the microcomputer 230 produces an accelerating command (in the direction of opening the valve). However, if the lifting speed is too quick in a short time, the same operation will be caused, with the result that the change of the speed cannot be smoothly shifted and it is difficult to stabilize the lifting speed.

The feature of the present embodiment resides in that, when effecting a predetermined lifting height speed control, upper and lower limits are set to the servo valve opening command so that the valve opening angle command is within the predetermined range, and that the function capable of delivering a control signal for the servo valve opening angle command, which feeds to the servomotor driving circuit 322' for controlling the first control valve 342, the first control circuit 262 in such a manner that the valve opening angle command is limited to the predetermined region, is rendered to the microcomputer 230.

Figure 19:
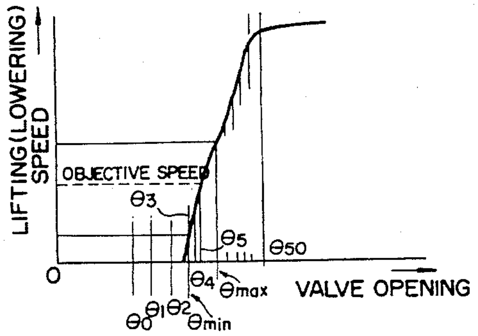
FIGS. 19 and 20 are graphs each illustrating the relationship between lifting speed and valve opening angle in a fifth embodiment of the present invention.

In the automatic lifting height control according to this embodiment, for instance, when effecting a low or very slow control, the device is designed so that a speed command can be produced solely between $\theta_{min.}$ and $\theta_{max.}$ in terms of the valve opening angle command in FIG. 19. In FIG. 19, the valve opening angle is equally divided into multi steps as indicated by $\theta_0$ to $\theta_{50}$. (For instance, the valve opening angle is divided into 50 steps)

Figure 20:
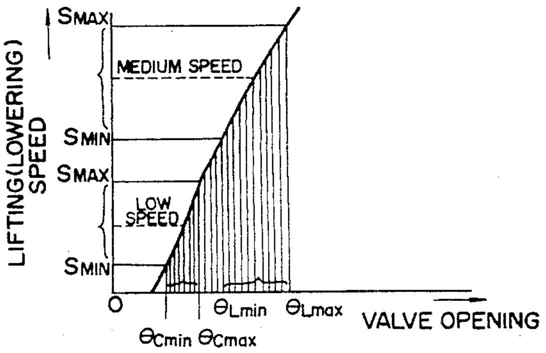

The present embodiment of automatic lifting height control of the present invention will be described with reference to a flow chart for a lifting height speed control routine shown in FIG. 21 and a characteristic curve illustrating a valve opening angle (lift valve opening angle) versus lifting height speed shown in FIG. 20. In FIG. 20, the valve opening angle is divided into multi steps, thereby making it easy to adjust the speed by increasing or decreasing by each one pitch. In FIG. 20, there occurs that the control region of medium speed overlaps with that of slow speed. The microcomputer 230 executes a lifting height speed control routine in FIG. 21. The microcomputer 230 judges as to whether the speed is medium or very slow at the step $S_1$. If the control is placed in the medium speed control condition, the upper limit $\theta_{Lmin.}$ and the lower limit $\theta_{Lmax.}$ of the valve opening angle (lift valve opening valve) is substituted for the upper limit $S_{max.}$ and the lower limit $S_{min.}$ of the lifting height speed as shown at the step $S_2$. Thus, the operational speed control region is set. In connection with the very slow control, the same setting is effected at the step $S_3$. The comparison between the setting speed and the actual speed (the speed sensed by the lifting height sensor 102) is effected at the step $S_4$. At the step $S_5$, the check whether the increasing or decreasing of the speed is required is effected. When it is necessary to increase the speed, the valve opening angle is increased by one step. At the step $S_6$, the judgement whether the speed is above the upper limit $S_{max.}$ if one step is added to the present opening angle is effected. If the speed is above the upper limit $S_{max.}$, one step is not added to the present opening angle to maintain the present opening angle of the valve (see step $S_9$). If the speed is not above the upper limit $S_{max.}$, the speed control signal added to the present opening angle by one step is produced (see step $S_8$). When the deceleration of the speed is required at the step $S_5$, the valve opening angle is reduced by one step. At step $S_7$, the judgment as to whether the speed is below the lower limit $S_{min.}$ set to be reduced by one step with respect to the present opening angle. If the speed is below the speed limit $S_{min.}$, the speed control signal of the present angle of the valve is maintained (see step $S_9$). If the speed is above the speed lower limit $S_{min.}$, the speed control signal reduced by one step with respect to the present opening angle (see step $S_{10}$). At the step $S_5$, if the setting speed is equal to the actual speed, the present opening angle command output of the valve is maintained.

Figure 21:
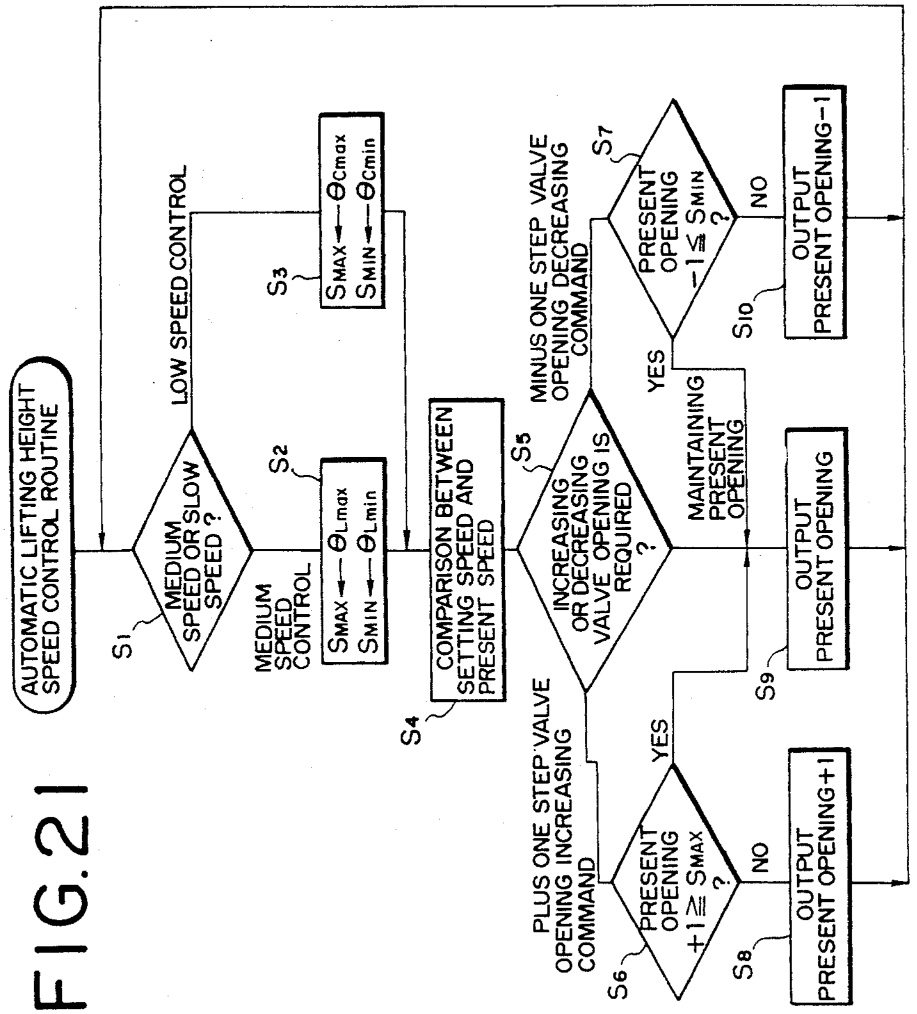
FIG. 21 is a flow chart illustrating an automatic lifting height speed control routine employed in the fifth embodiment of the present invention.

Thus, the speed control command signal corresponding to either of the steps $S_8$, $S_9$, and $S_{10}$ in the flow chart of FIG. 21 is delivered to the first control circuit 230 from the microcomputer 230 to effect a speed control due to the automatic lifting height control.

The program for speed control is stored in the microcomputer 230 as follows: When effecting medium speed control, the upper and lower limit $\theta_{Lmax.}$ and $\theta_{Lmin.}$ of the valve opening angle (the opening angle of the lift valve 342) corresponding to the upper and lower limits $S_{max.}$ and $S_{min.}$ of the speed are previously set. The microcomputer 230 delivers a speed control command signal to the first control circuit 262 in accordance with the flow chart shown in FIG. 21 so that the valve opening angle lies within the above mentioned valve opening angle region. In connection with the slow speed control, the same control is effected.

As is clear from the foregoing, since the prior art fork lift valve control device does not set the opening region of the lift valve in the adjustment of the speed, the speed is too quick or slow with the speed being beyond the predetermined region. As a result, it is difficult to adjust the speed with the result that the speed becomes unstable. On the contrary, according to the present embodiment, the lift valve adjusting region is limited to the predetermined region. Accordingly, the variable region of the actual lifting height speed is narrowed in accordance with the limitation of the lift valve adjusting region. As a result, the last mentioned embodiment makes it possible to stabilize the lifting speed.

Although several preferred embodiments of the present invention have been illustrated as described, it is believed evident to those skilled in the art that many changes and variations may be made without departing from the spirit and scope of the present invention. Accordingly, the present invention is to be considered as limited by the following claims.

What is claimed is:

1. A control device for a loading and unloading mechanism adapted to a fork lift truck comprising:

(a) a sensor unit including a lifting height sensor for measuring lifting height of a fork and producing output signals indicative thereof, (b) a control unit including (i) an interface circuit having a lifting height counter for counting the output signals from the sensor unit, (ii) a memory for storing data indicative of lifting height, said memory storing a data pattern shown target lifting height speeds with respect to an absolute value of a difference between a target lifting height and the present lifting height, (iii) data input means for inputting control data indicative of lifting height into the memory, and (iv) a control command producing circuit for performing a comparison calculation between the output signals of the sensor unit and the data stored in the memory, and for producing a valve opening command based on the comparison, said control command producing circuit operable for producing a control command for a target lifting speed in accordance with the difference read from said data pattern and in accordance with a current lifting height speed, (c) a servomotor driving circuit for producing a control signal responsive to the valve opening command signal from the control unit, (d) hydraulic pressure driving circuit producing a further control signal for hydraulically controlling a lift cylinder to vary the lifting height of the fork in accordance with the control signal fed from the servomotor driving circuit, and (e) inhibiting means in said control device for inhibiting storage in said memory of lifting height control data when the sensed lifting height is above a preselected upper limit or below a preselected lower limit, thereby to prevent erroneous operations and to smoothly effect an automatic lifting height control.

2. A control device for loading and unloading mechanism according to claim 1, wherein said inhibiting means comprises a first up-down counter responsive to the output signals of the lifting height sensor, a second up-down counter responsive to the output signal of said first up-down counter for presetting said upper limit, and a third up-down counter responsive to said first up-down counter for presetting said lower limit, wherein the storing in said memory of the lifting height control data is inhibited due to an output from either of said second and third up-down counters.

3. A control device for loading and unloading mechanism as defined in claim 1, wherein said hydraulic pressure driving unit comprises a control valve responsive to the output of said servomotor driving circuit, and a lift cylinder hydraulically controlled by said control valve.

4. A control device for loading and unloading mechanism as defined in claim 1, wherein said control unit further comprises a control circuit responsive to a difference between the control command fed from said control command producing circuit and the control signal of said servomotor driving circuit to control said servomotor driving circuit.

5. A control device for a loading and unloading mechanism adapted to a fork lift truck comprising:

(a) a sensor unit including a lifting height sensor for measuring lifting height of a fork and producing output signals indicative thereof, (b) a control unit including (i) an interface circuit having a lifting height counter for counting the output signals from the sensor unit, (ii) a memory for storing data indicative of lifting height, said memory storing a data pattern showing target lifting height speeds with respect to an absolute value of a difference between a target lifting height and the present lifting height, (iii) data input means for inputting control data indicative of lifting height into the memory, and (iv) a control command producing circuit for performing a comparison calculation between the output signals of the sensor unit and the data stored in the memory, and for producing a valve opening command based on the comparison, said control command producing circuit operable for producing a control command for a target lifting speed in accordance with the difference read from said data pattern and in accordance with a current lifting height speed, (c) a servomotor driving circuit for producing a control signal responsive to the valve opening command signal from the control unit, (d) a hydraulic pressure driving circuit producing a further control signal for hydraulically controlling a lift cylinder to vary the lifting height of the fork in accordance with the control signal fed from the servomotor driving circuit, (e) feedback control means responsive to said command signal for performing a predetermined lifting height operation when said command signal is generated so that the fork-lift response to said command signal is properly produced when the lifting height control operation is effected, and (f) inhibiting means in said control device for inhibiting storage in said memory of lifting height control data when the sensed lifting height is above a preselected upper limit or below a preselected lower limit, thereby to prevent erroneous operations and to smoothly effect an automatic lifting height control.

6. A control device for a loading and unloading mechanism according to claim 5, wherein said control command producing circuit is operable for producing a control command signal divided into a plurality of incremental steps as a function of the lifting height speed signal sensed by said lifting height sensor.

7. A control device for a loading and unloading mechanism according to claim 6, wherein said control command producing circuit includes means for comparing a control setting for the lifting height operation with data indicative of actual lifting height operation provided in a signal fed from said lifting height counter a predetermined time interval after said signal is fed thereto, said control command producing circuit further including means for incrementally providing a control command signal divided into a plurality of steps.

8. A control device for a loading and unloading mechanism according to claim 5, further comprising timer means provided in said command producing circuit for counting a pulse interval of a pulse output signal fed from said lifting height sensor to obtain said current lifting height speed.

9. A control device for a loading and unloading mechanism according to claim 5 wherein there is provided a push-button switch for slowly stopping a driving motor driven by said servomotor driving circuit, said control command producing circuit including means for producing a decelerating stepping command reducing the speed of the fork a predetermined time interval after activation of the push-button switch.

10. A control device for a loading and unloading mechanism according to claim 5 wherein there is provided a push-button switch for slowly stopping a driving motor driven by said servomotor driving circuit, said control command producing circuit including means for producing a decelerating stepping command reducing the speed of the fork after movement of the fork by a predetermined distance.

11. A control device for a loading and unloading mechanism according to claim 5, wherein said control command producing circuit produces a control command for limiting a valve opening angle of a control valve to a limited range selected as a function of operating speed of the fork lift.

12. A control device for a loading and unloading mechanism adapted to a fork lift truck comprising:

(a) a sensor unit including a lifting height sensor for measuring lifting height of a fork and producing output signals indicative thereof, (b) a control unit including (i) an interface circuit having a lifting height counter for counting the output signals from the sensor unit, (ii) a memory for storing data indicative of lifting height, said memory storing a data pattern showing target lifting height speeds with respect to an absolute value of a difference between a target lifting height and the present lifting height, (iii) data input means for inputting control data indicative of lifting height into the memory, and (iv) a control command producing circuit for performing a comparison calculation between the output signals of the sensor unit and the data stopped in the memory, and for producing a valve opening command based on the comparison, said control command producing circuit operable for producing a control command for a target lifting speed in accordance with the difference read from said data pattern and in accordance with a current lifting height speed, (c) a servomotor driving circuit for producing a control signal responsive to the valve opening command signal from the control unit, (d) a hydraulic pressure driving circuit producing a further control signal for hydraulically controlling a lift cylinder to vary the lifting height of the fork in accordance with the control signal fed from the servomotor driving circuit, (e) said hydraulic pressure driving circuit including means for providing speed control signals to control speed of operation of the lift cylinder including first and second feedback loops, (f) said first feedback loop providing said output signals of said height sensor to said control command producing unit for calculating therefrom a speed of fork lifting operation and for comparison of the calculated speed with a target speed, (g) said second feedback loop providing a signal representative of an actual valve opening corresponding to a rotating position of a valve driving motor driven by said servomotor driving circuit for comparing said control signal with a signal representative of actual valve opening, and (h) inhibiting means in said control device for inhibiting storage in said memory of lifting height control data when the sensed lifting height is above a preselected upper limit or below a preselected lower limit, thereby to prevent erroneous operations and to smoothly effect an automatic lifting height control.

13. A control device for a loading and unloading mechanism according to claim 12, wherein said control command producing circuit includes means for comparing a target speed for the speed of operation with data indicative of actual speed of operation provided in a signal fed from said lifting height counter a predetermined time interval after said signal is fed thereto, said control command producing circuit further including means for incrementally providing a conrol command signal divided into a plurality of steps.

14. A control device for a loading and unloading mechanism according to claim 12, wherein said means for providing control speed signals including processing means programmed for slowly stopping the fork in response to activation of a push-button by determining whether an operating speed range for the fork is high, medium or low;

changing the speed control signal to the next lower range;

repeating the program steps of determining and changing until the operating speed range is determined to be low; and generating a command for stopping movement of the fork.

15. A control device for a loading and unloading mechanism according to claim 14, wherein said processor means is further programmed for changing the operating speed ranges for predetermined time durations.

16. A control device for a loading and unloading mechanism according to claim 14, wherein said processor means is programmed for setting predetermined travel distances for the fork and for changing the operating speed ranges upon travel of said predetermined travel distances.

17. A control device for a loading and unloading mechanism according to claim 16, wherein said processor means is further programmed for setting said predetermined travel distances as a function of the operating speed range.

18. A control device for a loading and unloading mechanism adapted to a fork lift truck comprising:

(a) a sensor unit including a lifting height sensor for measuring lifting height of a fork and producing output signals indicative thereof, (b) a control unit including (i) an interface circuit having a lifting height counter for counting the output signals from the sensor unit, (ii) a memory for storing data indicative of lifting height, (iii) data input means for inputting control data indicative of lifting height into the memory, and (iv) a control command producing circuit for performing a comparison calculation between the output signals of the sensor unit and the data stored in the memory, and for producing a valve opening command based on the comparison, (c) a servomotor driving circuit for producing a control signal responsive to the valve opening command signal from the control unit, (d) a hydraulic pressure driving circuit producing a further control signal for hydraulically controlling a lift cylinder to vary the lifting height of the fork in accordance with the control signal fed from the servomotor driving circuit, (e) said hydraulic pressure driving circuit including means for providing speed control signals to control speed of operation of the lift cylinder including first and second feedback loops, (f) said first feedback loop providing said output signals of said height sensor to said control command producing unit for calculating therefrom a speed of fork lifting operation and for comparison of the calculated speed with a target speed, (g) said second feedback loop providing a signal representative of an actual valve opening corresponding to a rotating position of a valve driving motor driven by said servomotor driving circuit for comparing said control signal with a signal representative of actual valve opening, and (h) inhibiting means in said control device for inhibiting storage in said memory of lifting height control data when the sensed lifting height is above a preselected upper limit or below a preselected lower limit, thereby to prevent erroneous operations and to smoothly effect an automatic lifting height control, (i) said means for providing speed control signals including processing means programmed for providing follow-up height lift speed control by:

determining whether a difference exists between a target height and a present height;

when no difference is determined to exist, terminating the follow-up lift speed control;

when a difference is determined to exist, setting a target speed as a function of the determined difference;

determining present lift speed;

calculating a relative difference between present and target speed;

selecting one of a plurality of positive and a plurality of negative speed increment commands in accordance with the calculated relative difference; and incrementing the present speed by a number of steps determined in response to the selected speed increment command.

19. A control device for a loading and unloading mechanism according to claim 18, wherein said processor is further programmed for reading a table from a computer memory in order to set said target speed as a function of the determined difference, and for waiting a predetermined time period prior to repeating the programmed steps.

* * * * *

UNITED STATES PATENT AND TRADEMARK OFFICE

CERTIFICATE OF CORRECTION

PATENT NO. : 4,509,127

DATED : April 2, 1985

INVENTOR(S) : Katsumi YUKI et al

It is certified that error appears in the above-identified patent and that said Letters Patent is hereby corrected as shown below:

Page 1, of the Patent, insert:

[73] Assignees: Kabushiki Kaisha Toyoda Jidoh Shokki Seisakusho, Japan; Kabushiki Kaisha Meidensha, Tokyo, Japan Page 1, under "Foreign Application Priority Date", insert:

Mar. 31, 1981 [JP] Japan ........56-47736
Mar. 31, 1981 [JP] Japan ........56-47738
Mar. 31, 1981 [JP] Japan ........56-47740
Mar. 31, 1981 [JP] Japan ........56-47742
Mar. 31, 1981 [JP] Japan .....56-45959[U]

Signed and Sealed this

*Thirteenth* Day of *August 1985*

[SEAL]

*Attest:*

DONALD J. QUIGG

*Attesting Officer* — *Acting Commissioner of Patents and Trademarks*